US011770025B2

(12) United States Patent
Jiang et al.

(10) Patent No.: US 11,770,025 B2
(45) Date of Patent: Sep. 26, 2023

(54) WIRELESS POWER TRANSMISSION APPRATUS AND CONTROL METHOD THEREOF

(71) Applicant: Delta Electronics (Shanghai) Co., Ltd., Shanghai (CN)

(72) Inventors: Qing Jiang, Shanghai (CN); Yongkai Liao, Shanghai (CN); Min Xu, Shanghai (CN); Shunyang Ji, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 25 days.

(21) Appl. No.: 17/367,428

(22) Filed: Jul. 5, 2021

(65) Prior Publication Data

US 2022/0085649 A1 Mar. 17, 2022

(30) Foreign Application Priority Data

Sep. 15, 2020 (CN) .......................... 202010967911.7

(51) Int. Cl.
*H02J 50/12* (2016.01)
(52) U.S. Cl.
CPC .................... *H02J 50/12* (2016.02)
(58) Field of Classification Search
CPC ............ H02J 50/12; H02J 50/80; B60L 53/00
See application file for complete search history.

(56) References Cited

U.S. PATENT DOCUMENTS

2016/0355095 A1* 12/2016 Okamoto ................ B60L 50/51
2018/0241301 A1* 8/2018 Nagaoka ................. H02M 1/14
2021/0023958 A1* 1/2021 Tombelli ........... H02J 7/007192
2021/0061112 A1* 3/2021 Jones .................. G07C 5/0833

FOREIGN PATENT DOCUMENTS

CN      103166329 B    12/2014
CN      105826997 B     7/2018

\* cited by examiner

*Primary Examiner* — Rexford N Barnie
*Assistant Examiner* — Joseph N Inge
(74) *Attorney, Agent, or Firm* — CKC & Partners Co., LLC

(57) ABSTRACT

Provided are a wireless power transmission apparatus and a control method thereof. The apparatus includes a transmitting unit which includes an inverter circuit, a first compensation circuit, and a transmitting coil; a receiving unit which includes a receiving coil, a second compensation circuit, and a rectifier circuit; a power regulation unit configured to regulate an output signal of the wireless power transmission apparatus; and a control unit configured to: acquire a voltage-and-current phase difference of the transmitting unit, a detection signal, and a power detection value of the wireless power transmission apparatus; control an operating frequency of the inverter circuit according to the voltage-and-current phase difference and a preset phase difference, and generate a power derating signal according to the detection signal, and control, according to the power derating signal, the power detection value and a power reference signal, the power regulation unit to regulate the output signal.

13 Claims, 15 Drawing Sheets

WIRELESS POWER TRANSMISSION APPRATUS AND CONTROL METHOD THEREOF

CROSS-REFERENCE TO RELATED APPLICATION

This application claims priority to Chinese Patent Application No. 202010967911.7, filed on Sep. 15, 2020, which is hereby incorporated by reference in its entirety.

TECHNICAL FIELD

The present application relates to the field of wireless power transmission technologies and, in particular, to a wireless power transmission apparatus and a control method thereof.

BACKGROUND

The most common technology for wireless power transmission is electromagnetic induction. A magnetic field is used to transmit energy between a power supply and a power appliance without the need of a wire therebetween.

A common wireless power transmission apparatus includes a transmitting unit and a receiving unit. The transmitting unit includes a transmitting coil and an inverter circuit, and the receiving unit includes a receiving coil and a rectifier circuit. Where the transmitting coil and the receiving coil constitute a loosely coupled transformer. The loosely coupled transformer has a low coupling coefficient and a large reactive power circulating current which increases its loss. In particular, when the distance between the transmitting coil and the receiving coil is increased or when there is a misalignment between the transmitting coil and the receiving coil, the loss of the loosely coupled transformer further increases, and the transmission efficiency of the wireless power transmission apparatus is significantly reduced, and the thermal stress increases. The load of the wireless power transmission apparatus is an energy storage device, such as a battery, which is different from conventional electrical loads, and often allows the wireless power transmission apparatus to operate under a non-rated operating condition of reducing the output power (e.g. non-rated operating temperatures), so as to reduce the thermal stress.

In order to improve the transmission efficiency and the thermal stress of the wireless power transmission apparatus, a compensation method that a compensation circuit is coupled between the transmitting coil and the inverter circuit, and a compensation circuit is coupled between the receiving coil and the rectifier circuit is often used to reduce the reactive power during power transmission and thus reduce the loss of the loosely coupled transformer. However, the compensation method makes it difficult to reduce the current of the transmitting unit by reducing the output power, which causes the wireless power transmission apparatus to operate beyond the rated operating temperature range with the thermal stress, resulting in damage to the wireless power transmission apparatus or triggering an over-temperature protection to stop the operation of the wireless power transmission apparatus.

Therefore, the development of a wireless power transmission apparatus that can overcome these shortcomings is an urgent need currently.

SUMMARY

The present application provides a wireless power transmission apparatus and a control method thereof, which is intended to provide a wireless power transmission apparatus capable of reducing a voltage or current of a transmitting unit by reducing an output signal.

In a first aspect, the present application provides a wireless power transmission apparatus, comprising:

a transmitting unit, including an inverter circuit, a first compensation circuit and a transmitting coil, the first compensation circuit being coupled between the inverter circuit and the transmitting coil;

a receiving unit, including a receiving coil, a second compensation circuit and a rectifier circuit, the second compensation circuit being coupled between the receiving coil and the rectifier circuit:

a power regulation unit, configured to regulate an output signal of the wireless power transmission apparatus; and a control unit, coupled to the inverter circuit and the power regulation unit, respectively, and configured to: acquire a voltage-and-current phase difference of the transmitting unit, a detection signal, and a power detection value of the wireless power transmission apparatus; control an operating frequency of the inverter circuit according to the voltage-and-current phase difference and a preset phase difference in such a manner that the voltage-and-current phase difference is equal to the preset phase difference, and generate a power derating signal according to the detection signal, and control, according to the power derating signal, the power detection value and a power reference signal, the power regulation unit to regulate the output signal.

Optionally, the first compensation circuit, the transmitting coil, the receiving coil and the second compensation circuit form a resonant network;

the resonant network includes a first resonant frequency and a second resonant frequency, where the second resonant frequency is higher than the first resonant frequency; and the operating frequency is higher than the second resonant frequency; or, the operating frequency is equal to the second resonant frequency; or, the operating frequency is lower than the second resonant frequency and higher than the first resonant frequency.

Optionally, the wireless power transmission apparatus further includes: a phase detection unit;

the phase detection unit is coupled to the transmitting unit and the control unit, and is configured to acquire a voltage phase signal and a current phase signal of the transmitting unit and calculate the voltage-and-current phase difference according to the voltage phase signal and the current phase signal.

Optionally, the phase detection unit includes: a voltage phase detection unit, a current phase detection unit and a phase difference calculation unit;

the voltage phase detection unit is coupled to an output terminal of the inverter circuit and is configured to detect the voltage phase signal of the transmitting unit;

the current phase detection unit is coupled between the inverter circuit and the first compensation circuit, or between the first compensation circuit and the transmitting coil, and is configured to detect the current phase signal of the transmitting unit; and the phase difference calculation unit is configured to acquire the voltage phase signal and the current phase signal and calculate the voltage-and-current phase difference according to the voltage phase signal and the current phase signal.

Optionally, the control unit is configured specifically to:

generate the power derating signal when the detection signal reaches a preset value, and provide a power regulation signal according to the power derating signal and the power reference signal, and control, according to the power regulation signal and the power detection value, the power regulation unit to reduce the output signal, so that a current of the transmitting unit is reduced or a voltage of the transmitting unit is reduced.

Optionally, the detection signal is a temperature signal and the preset value is a preset temperature value;

the control unit is configured to generate the power derating signal when the temperature signal reaches the preset temperature value.

Optionally, the detection signal is a duration signal and the preset value is a preset duration signal;

the control unit is configured to generate the power derating signal when the duration signal reaches the preset duration signal.

Optionally, the wireless power transmission apparatus further includes: a temperature detection unit;

the temperature detection unit is coupled to the control unit and is configured to detect an ambient temperature or a temperature of a component of the wireless power transmission apparatus and provide the temperature signal.

Optionally, the wireless power transmission apparatus further includes: an output power detection unit;

the output power detection unit is coupled to an output terminal of the wireless power transmission apparatus and the control unit, and is configured to detect an output power of the wireless power transmission apparatus and provide the power detection value.

Optionally, the wireless power transmission apparatus further includes: an output current detection unit and an output voltage detection unit.

the output current detection unit is coupled to an output terminal of the wireless power transmission apparatus and the control unit, and is configured to detect an output current of the wireless power transmission apparatus and provide a current detection value;

the output voltage detection unit is coupled to the output terminal of the wireless power transmission apparatus and the control unit, and is configured to detect an output voltage of the wireless power transmission apparatus and provide a voltage detection value;

the control unit is configured to acquire the current and voltage detection values and acquire the power detection value according to the current and voltage detection value.

Optionally, the output signal includes one or more of an output current, an output voltage, or an output power.

Optionally, the power regulation unit includes any one of a buck circuit, a boost circuit, or a buck-boost circuit.

Optionally, the power regulation unit is electrically coupled between an input terminal of the wireless power transmission apparatus and the transmitting unit; or, the power regulation unit is electrically coupled between the receiving unit and the output terminal of the wireless power transmission apparatus.

Optionally, the transmitting unit further includes a transmitter transformer;

the transmitter transformer is coupled between the inverter circuit and the first compensation circuit; or, the transmitter transformer is coupled between the first compensation circuit and the transmitting coil.

Optionally, the receiving unit further includes: a receiver transformer;

the receiver transformer is coupled between the receiving coil and the second compensation circuit; or, the receiver transformer is coupled between the second compensation circuit and the rectifier circuit.

In a second aspect, the present application provides a control method of a wireless power transmission apparatus, where the method is applied to the wireless power transmission apparatus covered by the first aspect and the optional solutions; the method includes:

acquiring a detection signal;

acquiring a voltage-and-current phase difference of a transmitting unit;

acquiring a power detection value; and controlling an operating frequency of a inverter circuit according to the voltage-and-current phase difference and a preset phase difference in such a manner that the voltage-and-current phase difference is equal to the preset phase difference, generating a power derating signal according to the detection signal, and controlling a power regulation unit to regulate an output signal of the wireless power transmission apparatus according to the power derating signal, the power detection value and a power reference signal.

Optionally, the acquiring a voltage-and-current phase difference of a transmitting unit, specifically includes:

acquiring a voltage phase signal of the transmitting unit;

acquiring a current phase signal of the transmitting unit; and calculating the voltage-and-current phase difference according to the voltage phase signal and the current phase signal.

Optionally, generating a power derating signal according to the detection signal, and controlling a power regulation unit to regulate an output signal of the wireless power transmission apparatus according to the power derating signal, the power detection value and a power reference signal, specifically includes:

generating the power derating signal when the detection signal reaches a preset value, and providing a power regulation signal according to the power derating signal and the power reference signal, and controlling, according to the power regulation signal and the power detection value, the power regulation unit to reduce the output signal, so that a current of the transmitting unit is reduced or a voltage of the transmitting unit is reduced.

Optionally, the detection signal is a temperature signal and the preset value is a preset temperature value;

generating the power derating signal when the temperature signal reaches the preset temperature value.

Optionally, the acquiring a power detection value, specifically includes:

acquiring a current detection value;

acquiring a voltage detection value; and calculating the power detection value according to the current detection value and the voltage detection value.

The present application provides a wireless power transmission apparatus and a control method thereof, where the operating frequency of the inverter circuit is controlled through the voltage-and-current phase difference and the preset phase difference so that the voltage-and-current phase difference of the transmitting unit is equal to the preset phase difference, and the power regulation unit is controlled, through the detection signal, the power detection value and the power reference signal, to regulate the output signal so that the wireless power transmission apparatus operates under the condition of reducing the output power, thereby reducing the voltage or current of the transmitting unit, thus reducing the heat generation of the wireless power transmission apparatus and ensuring the continuous operation of the wireless power transmission apparatus.

DESCRIPTION OF EMBODIMENTS

To make the objectives, technical solutions, and advantages of embodiments of the present application clearer, the following clearly and comprehensively describes the technical solutions in embodiments of the present application with reference to the accompanying drawings in embodiments of the present application. Apparently, the described embodiments are merely a part rather than all embodiments of the present application. All other embodiments obtained by persons of ordinary skill in the art based on embodiments of the present application without creative effort shall fall within the protection scope of the present application.

Figure 1:
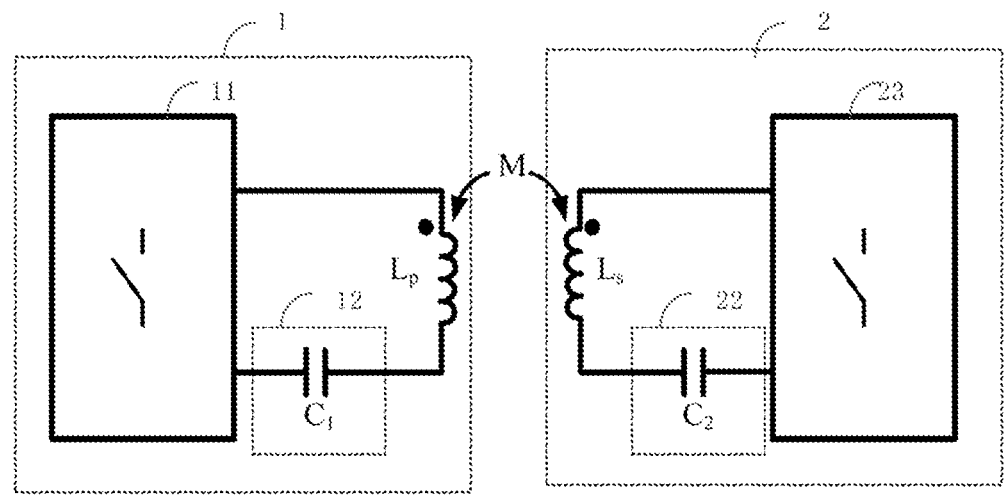
FIG. 1 is a schematic diagram of a circuit structure of a wireless power transmission apparatus provided in an embodiment of the present application.
Figure 2:
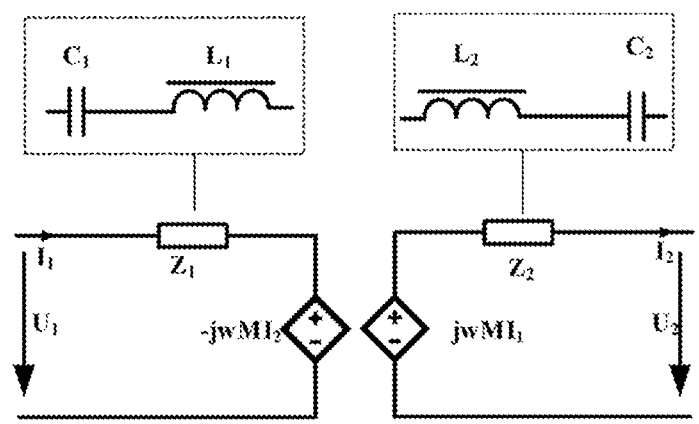
FIG. 2 is a schematic diagram of a compensating fundamental wave equivalent circuit of the wireless power transmission apparatus shown in FIG. 1.

As shown in FIG. 1, the wireless power transmission apparatus includes a transmitting unit 1 and a receiving unit 2, where the transmitting unit 1 includes an inverter circuit 11, a first compensation circuit 12 and a transmitting coil $L_p$, and the first compensation circuit 12 is coupled between the inverter circuit 11 and the transmitting coil $L_p$; the receiving unit 2 includes a receiving coil $L_s$, a second compensation circuit 22 and a rectifier circuit 23, and the second compensation circuit 22 is coupled between the receiving coil $L_s$ and the rectifier circuit 23. In the present embodiment, the first compensation circuit 12 and the second compensation circuit 22 are both series compensation circuits, specifically, where the first compensation circuit 12 includes a capacitor $C_1$ and the second compensation circuit includes a capacitor $C_2$, and the capacitor $C_1$ is coupled in series between the inverter circuit 11 and the transmitting coil $L_p$, and the capacitor $C_2$ is coupled in series between the receiving coil $L_s$ and the rectifier circuit 23. A compensating fundamental wave equivalent circuit as shown in FIG. 2 can be acquired by using the fundamental wave equivalence. When the wireless power transmission apparatus is operating at a resonant frequency that compensates for the self-inductance of the transmitting coil $L_p$, the capacitor $C_1$ fully compensates for the self-inductance, and the current $I_1$ of the transmitting unit 1 can be calculated as:

$$I_1 = \frac{U_2}{\omega M} \qquad (1)$$

where $U_2$ represents a voltage value of an output voltage of the wireless power transmission apparatus, $\omega$ represents a current angular frequency of the transmitting unit 1, and M represents an inductance value of a mutual inductance between the transmitting coil $L_p$ and the receiving coil $L_s$.

Figure 3:
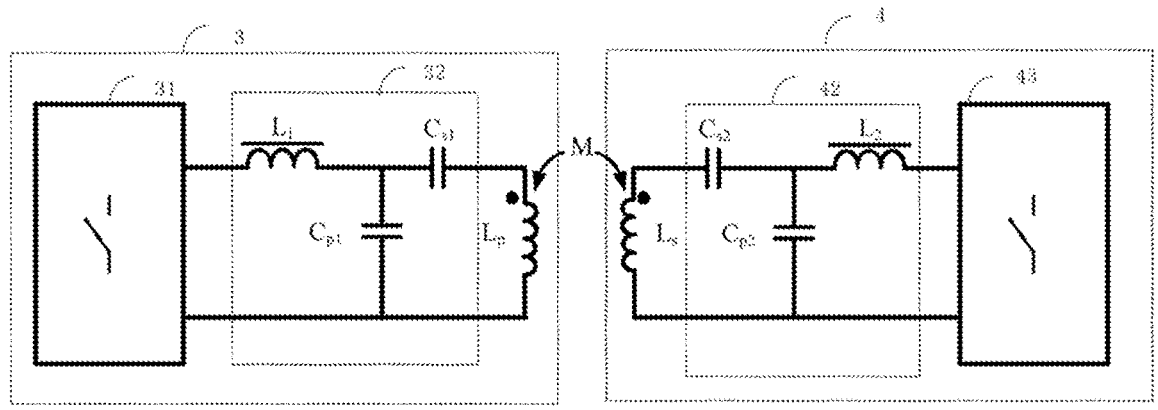
FIG. 3 is a schematic diagram of a circuit structure of an alternative wireless power transmission apparatus provided in an embodiment of the present application.
Figure 4:
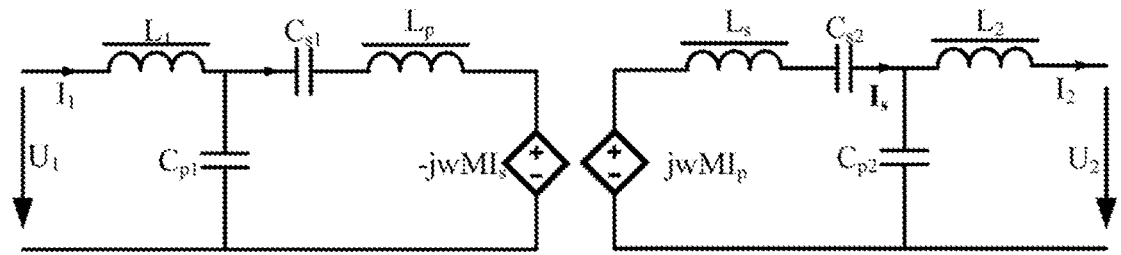
FIG. 4 is a schematic diagram of a compensating fundamental wave equivalent circuit of the wireless power transmission apparatus shown in FIG. 3.

The circuit structure in the wireless power transmission apparatus shown in FIG. 1 is mostly identical to the circuit structure in the wireless power transmission apparatus shown in FIG. 3, the same circuit structure shown in FIG. 1 and FIG. 3 will not be repeated herein. The first compensation circuit and the second compensation circuit, which are not identical in the wireless power transmission apparatus shown in FIG. 3 and FIG. 1, are described below. As shown in FIG. 3, the first compensation circuit 32 and the second compensation circuit 42 in the wireless power transmission apparatus are both inductor and capacitor and capacitor (LCC) compensation circuits, specifically, where the first compensation circuit 32 includes an inductor $L_1$, a capacitor $C_{p1}$ and a capacitor $C_{s1}$, where one end of the inductor $L_1$ is connected to one end of the capacitor $C_{p1}$ and one end of the capacitor $C_{s1}$ respectively, and the other end of inductor $L_1$ is coupled to one output terminal of the inverter circuit 31, and the other end of capacitor $C_{p1}$ is electrically coupled to the other output terminal of the inverter circuit 31 and one end of transmitting coil $L_p$, and the other end of capacitor $C_{s1}$ is electrically coupled to the other end of the transmitting coil $L_p$; the second compensation circuit 42 includes an inductor $L_2$, a capacitor $C_{p1}$ and a capacitor $C_{s2}$, where one end of the inductor $L_2$ is connected to one end of the capacitor $C_{p1}$ and one end of the capacitor $C_{s2}$ respectively, and the other end of the inductance $L_2$ is coupled to one input terminal of the rectifier circuit 43, and the other end of the capacitor $C_{p1}$ is electrically coupled to one end of the receiving coil $L_s$ and the other input terminal of the rectifier circuit 43, and the other end of the capacitor $C_{s2}$ is electrically coupled to the other end of the receiving coil $L_s$. The compensation fundamental wave equivalent circuit shown in FIG. 4 can be acquired by using the fundamental wave equivalence, and when the operating frequency of the wireless power transmission apparatus satisfies the following Equation (2) to Equation (5), the current I1 of the transmitting unit 1 can be calculated as Equation (6)

$$L_1 C_{p1} = \frac{1}{\omega^2} \quad (2)$$

$$L_2 C_{p2} = \frac{1}{\omega^2} \quad (3)$$

$$(L_p - L_1) C_{s1} = \frac{1}{\omega^2} \quad (4)$$

$$(L_p - L_2) C_{s2} = \frac{1}{\omega^2} \quad (5)$$

$$I_1 = \frac{M U_2}{\omega L_1 L_2} \quad (6)$$

Where $L_1$ represents an inductance value of the compensation inductor, and $C_{p1}$ represents a capacitance value of the compensation capacitor, and $C_{s1}$ represents a capacitance value of the compensation capacitor, and $L_2$ represents an inductance value of the compensation inductor, and $C_{p1}$ represents a capacitance value of the compensation capacitor, and $C_{s2}$ represents a capacitance value of the compensation capacitor, and $\omega$ represents the current angular frequency of the transmitting unit 1, and M represents the inductance value of the mutual inductance between the transmitting coil $L_p$ and the receiving coil $L_s$, and $U_2$ represents a voltage value of an input voltage of the rectifier circuit.

According to Equations (1) and (6), it can be seen that when the output power of the wireless power transmission apparatus decreases, the current of the transmitting unit does not decrease accordingly, i.e., the purpose of reducing the current of the transmitting unit by decreasing the output power cannot be achieved, and it should be noted that the current of the transmitting unit can be the output current of the inverter circuit.

Figure 5:
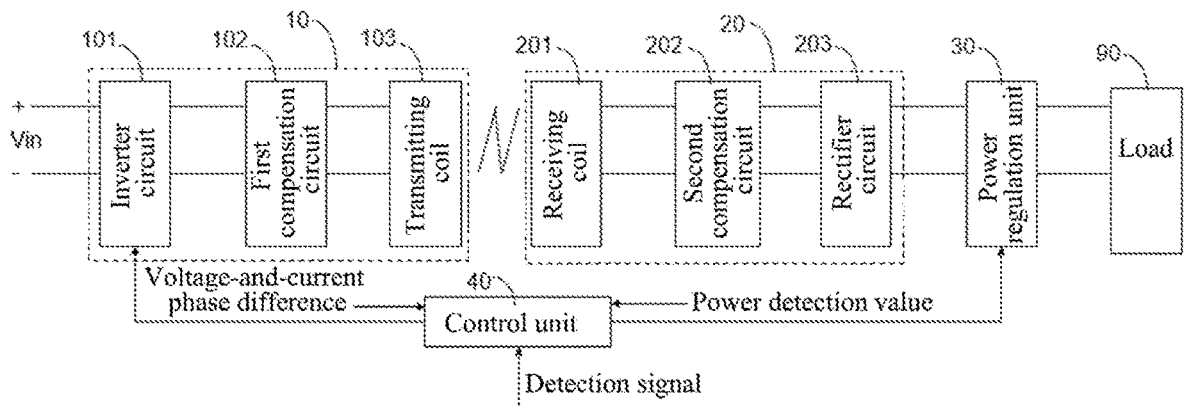
FIG. 5 is a schematic diagram of a circuit structure of another wireless power transmission apparatus provided in an embodiment of the present application.

In order to improve the transmission efficiency and thermal stress of the wireless power transmission apparatus shown in FIGS. 1 and 3, the wireless power transmission apparatus provided in FIG. 5 is capable of achieving a decrease of the current or voltage of the transmitting unit with a decrease of the output power.

As shown in FIG. 5, the wireless power transmission apparatus provided in an embodiment of the present application includes a transmitting unit 10, a receiving unit 20, a power regulation unit 30, and a control unit 40.

Where the transmitting unit 10 is configured to receive electrical energy Vin, where the electrical energy may be direct current electrical energy. The receiving unit 20 is configured to be connected to a load 90, where the load 90 may be an energy storage device, such as a battery. The transmitting unit 10 further includes an inverter circuit 101, a first compensation circuit 102, and a transmitting coil 103. The first compensation circuit 102 is coupled between the inverter circuit 101 and the transmitting coil 103. Specifically, the first compensation circuit 102 connected in series with the transmitting coil 103 is connected to an output terminal of the inverter circuit 101, or the first compensation circuit 102 connected in parallel with the transmitting coil 103 is connected to an output terminal of the inverter circuit 101.

The receiving unit 20, in turn, includes a receiving coil 201, a second compensation circuit 202, and a rectifier circuit 203. The second compensation circuit 202 is coupled between the receiving coil 201 and the rectifier circuit 203. Specifically, the second compensation circuit 202 connected in series with the receiving coil 201 is connected to an input terminal of the rectifier circuit 203, or the second compensation circuit 202 connected in parallel with the receiving coil 201 is connected to the input terminal of the rectifier circuit 203.

Where the structure of the transmitting unit 10 and the receiving unit 20 in FIG. 5 may be the same as the transmitting unit 1 and the receiving unit 2, respectively, of FIG. 1; or the structure of the transmitting unit 10 and the receiving unit 20 in FIG. 5 may be the same as the transmitting unit 3 and the receiving unit 4, respectively, of FIG. 3.

The inverter circuit 101 may be a half-bridge inverter circuit or a full-bridge inverter circuit. The inverter circuit 101 is configured to receive the direct current electrical energy Vin and convert this direct current electrical energy to alternating current electrical energy. The first compensation circuit 102 is configured to compensate a portion of the reactive power of the transmitting coil 103, and the transmitting coil 103 is configured to receive the alternating current energy output by the inverter circuit 101 and to generate an alternating magnetic field.

The receiving coil 201 is configured to sense the alternating magnetic field and convert the alternating magnetic field into alternating current electrical energy. It should be noted that the alternating current electrical energy output by the inverter circuit 101 and the alternating current electrical energy received by the rectifier circuit may or may not be the same. The second compensation circuit 202 is configured to compensate the reactive power of the receiving coil 201. The rectifier circuit 203 is configured to receive the alternating current electrical energy and convert the alternating current electrical energy into direct current electrical energy. The rectifier circuit 203 may be a full-wave rectifier circuit or a full-bridge rectifier circuit.

The power regulation unit 30 is configured to regulate an output signal of the wireless power transmission apparatus, wherein the power regulation unit 30 may be any one of a buck circuit, a boost circuit, or a buck-boost circuit. In the present embodiment, the power regulation unit 30 is coupled between the rectifier circuit 203 and the output terminal of the wireless power transmission apparatus which is connected to the load 90. The control unit 40 is configured to acquire a voltage-and-current phase difference of the transmitting unit 10, a detection signal, and a power detection value of the wireless power transmission apparatus. The operating frequency of the inverter circuit 101 is controlled according to the voltage-and-current phase difference and a preset phase difference so that the voltage-and-current phase difference is equal to the preset phase difference. That is, the control unit 40 is configured to compare the voltage-and-current phase difference and the preset phase difference, and generate a control signal of the inverter circuit 101 according to a comparison result of the voltage-and-current phase difference and the preset phase difference, the control signal is used for controlling the operating frequency of the inverter circuit 101 so that the voltage-and-current phase difference of the transmitting unit 10 is equal to the preset phase difference. In the present embodiment, the preset phase difference may be set internally by the control unit 40, or may be provided by an external circuit.

The control unit 40 is further configured to generate a power derating signal according to the detection signal and control, according to the power derating signal, the power detection value and a power reference signal, the power regulation unit 30 to regulate the output signal of the wireless power transmission apparatus. Specifically, the control unit 40 receives the detection signal and generates the power derating signal when the detection signal reaches a preset value, that is, the power derating signal is generated only when the detection signal satisfies the preset condition, where the preset value may be set internally by the control unit 40 or provided by an external circuit. The control unit 40 then generates a power regulation signal according to the power derating signal and the power reference signal, wherein the power reference signal is an output power signal of the wireless power transmission apparatus under rated conditions. The power reference signal may be provided by an external circuit. The external circuit may receive a voltage instruction and a current instruction provided by a charging protocol, and calculate the power reference signal according to the voltage instruction and the current instruction. In some embodiments, the control unit 40 may receive a voltage instruction and a current instruction provided by an external battery system, and calculate the power reference signal according to the voltage instruction and the current instruction. In some embodiments, the power reference signal may be set internally by the control unit 40. The control unit 40 compares the power regulation signal and the power detection value, and generates a control signal according to the comparison result to control the power regulation unit 30 to regulate the output signal of the wireless power transmission apparatus, where the output signal includes one or more of an output voltage, an output current, or an output power. The control unit 40 controls the power regulation unit 30 to regulate the output signal of the wireless power transmission apparatus, i.e., the control unit 40 controls the power regulation unit 30 to reduce the output voltage and/or the output current to decrease the output power.

In the present embodiment, the current of the transmitting unit 10 decreases with the decrease of the output signal; or the voltage of the transmitting unit 10 decreases with the decrease of the output signal.

The wireless power transmission apparatus described in the above embodiment can operate under an operating condition of reducing output power, thereby reducing the current or the voltage of the transmitting unit 10, thus reducing the loss, reducing the thermal stress of the wireless power transmission apparatus, and ensuring the continuous operation of the wireless power transmission apparatus.

The detection signal may be a temperature signal, and the preset value may be a preset temperature value. The control unit 40 receives the temperature signal and generates a power derating signal when the temperature signal reaches the preset temperature value. The preset temperature value may be a rated operating temperature of the wireless power transmission apparatus or may also be a temperature limit value of internal components of the wireless power transmission apparatus. The control unit 40 then generates a power regulation signal according to the power derating signal and the power reference signal, and then controls the power regulation unit 30 to reduce the output signal of the wireless power transmission apparatus, such as the output power, according to the power regulation signal and the power detection value of the wireless power transmission apparatus detected in real time, when the temperature signal reaches the preset temperature value, the current of the transmitting unit 10 decreases with the decrease of the output signal, or the voltage of the transmitting unit 10 decreases with the decrease of the output signal, which reduces the heat generation of the wireless power transmission apparatus under the operating condition exceeding the preset temperature value, and reduces the rate of temperature rising, and reduces the thermal stress of the wireless power transmission apparatus and ensures the continuous operation of the wireless power transmission apparatus.

The detection signal may be a duration signal, and the preset value may be a preset duration signal. The control unit 40 is configured to generate a power derating signal when the duration signal reaches the preset duration signal, wherein the preset duration signal is the rated operating duration of the wireless power transmission apparatus. The control unit 40 generates a power regulation signal according to the power derating signal and the power reference signal, and then controls the power regulation unit 30 to reduce the output signal of the wireless power transmission apparatus, such as output power, according to the power regulation signal and the power detection value of the wireless power transmission apparatus detected in real time. When the duration signal reaches the preset duration value, the current of the transmitting unit 10 decreases with the decrease of the output signal, or the voltage of the transmitting unit 10 decreases with the decrease of the output signal, which reduces the heat generation of the wireless power transmission apparatus under the operating condition exceeding the preset duration value, and reduces the rate of temperature rising, reduces the thermal stress of the wireless power transmission apparatus, and ensures the continuous operation of the wireless power transmission apparatus.

With reference to FIG. 5, the wireless power transmission apparatus provided in the present embodiment includes a transmitting unit 10, a receiving unit 20, a power regulation unit 30, and a control unit 40.

Where the transmitting unit 10 includes an inverter circuit 101, a first compensation circuit 102 and a transmitting coil 103. The first compensation circuit 102 is coupled between the inverter circuit 101 and the transmitting coil 102. The receiving unit 20 also includes a receiving coil 201, a second compensation circuit 202, and a rectifier circuit 203. The second compensation circuit 202 is coupled between the receiving coil 201 and the rectifier circuit 203.

Where the first compensation circuit 102, the transmitting coil 103, the receiving coil 201, and the second compensation circuit 202 form a resonant network. In the present embodiment, parameters of the resonant network are designed in a way of bifurcation frequency compensation to cause a frequency bifurcation phenomenon of the resonant network.

The aforementioned bifurcation phenomenon is a concept of a nonlinear power system. For a soft-switching system, when the system parameters change, the resonant frequencies of which the phase of the input impedance is zero are not unique. The phase of the input impedance being zero means that the input port of the inverter circuit 101 of the transmitting unit 10 is equivalent to purely resistive, i.e., the input impedance of the inverter circuit 101 is purely resistive.

Figure 6:
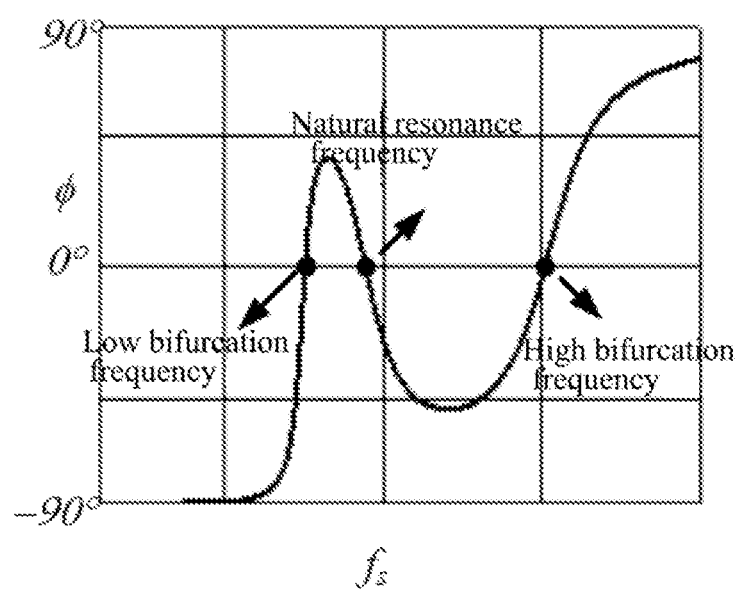
FIG. 6 is a schematic diagram of a relationship between phases and frequencies provided in an embodiment of the present application.

In combination with FIGS. 5 and 6, when the phase of the input impedance is zero in the present example, the resonant network includes three resonant frequency, which are a first resonant frequency (a natural resonant frequency), a second resonant frequency (a high bifurcation frequency) and a third resonant frequency (a low bifurcation frequency). The second resonant frequency is higher than the first resonant frequency and the first resonant frequency is higher than the third resonant frequency. The control unit 40 controls the operating frequency of the inverter circuit 101 to be in the vicinity of the second resonant frequency so that the voltage-and-current phase difference of the transmitting unit is equal to the preset phase difference. Specifically, the operating frequency may be higher than the second resonant frequency, or equal to the second resonant frequency, or lower than the second resonant frequency and higher than the first resonant frequency, thereby achieving a smaller current or voltage of the transmitting unit 10. The embodiment enables the voltage or current of the transmitting unit 10 to decrease with the decrease of the output signal, thereby reducing the thermal stress of the transmitting unit 10.

When the resonant network operates in the vicinity of the high bifurcation resonant frequency, that is, when the switching frequency of the inverter circuit 101 is in the vicinity of the high bifurcation resonant frequency, the first compensation circuit 102 does not fully compensate the self-inductance of the transmitting coil 103, so that the first compensation circuit 102 and the self-inductance of the transmitting coil 103 present a certain impedance. The input impedance of the inverter circuit 101 is purely resistive, the current or voltage of the transmitting unit 10 decreases with the decrease of the output signal of the wireless power transmission apparatus, and thus the thermal stress of the wireless power transmission apparatus can be reduced.

The bifurcation frequency compensation method of the resonant network is illustrated below in conjunction with FIGS. 2, 5 and 6. The first compensation circuit 102 is a capacitor $C_1$ and the second compensation capacitor 202 is a capacitor $C_2$.

The key to the parameter design of the bifurcation frequency compensation is that the capacitors $C_1$ and $C_2$ do not fully compensate the self-inductance $L_1$ of the transmitting coil 103 and the self-inductance $L_2$ of the receiving coil 201. The capacitors $C_1$ and $C_2$ and the self-inductance $L_1$ of the transmitting coil 103 and the self-inductance $L_2$ of the receiving coil 201 present certain impedance. The input impedance of the inverter circuit 101 is purely resistive. The phase angle between the voltage and current of the transmitting unit 10 is zero. The imaginary part of the input impedance satisfies the following equation:

$$\text{Im}\left(\frac{U_1}{I_1}\right) = 0 \tag{7}$$

Where $U_1$ represents the voltage value of the output voltage of the inverter circuit 101, and $I_1$ represents the current value of the current of the transmitting unit 10, i.e., the current value of the output current of the inverter circuit 101, and Im represents the imaginary part.

To simplify the analysis, the resonant network with symmetrical primary and secondary sides is taken herein as an example, inductance values of the self-inductance $L_1$ of the transmitting coil 103 and the self-inductance $L_2$ of the receiving coil 201 are equal, and capacitance values of the capacitor $C_1$ and the capacitor $C_2$ are equal. Combined with the diagram of the compensation fundamental wave equivalent circuit of FIG. 2, it can be seen that the output voltage $U_1$ of the inverter circuit 101 and the current $I_1$ of the transmitting unit 10 satisfy the following equation:

$$\vec{U}_1 = Z_1\vec{I}_1 - j\omega M\vec{I}_2 \tag{8}$$

The impedance consisting of the capacitor $C_1$ and the self-inductance $L_1$ of the transmitting coil 103 satisfies the following equation:

$$Z_1 = j\omega L_1 + \frac{1}{j\omega C_1} \tag{9}$$

The input voltage $U_2$ of the rectifier circuit 203 and the current $I_2$ of the receiving unit 20 satisfy the following equations:

$$\vec{U}_2 = -Z_2\vec{I}_2 + j\omega M\vec{I}_1 \tag{10}$$

$$\vec{U}_2 = R_L\vec{I}_2 \tag{11}$$

The operating frequency that makes the input impedance of the inverter circuit 101 be purely resistive is acquired from Equations (7)-(11) and satisfies the following equation.

$$\omega^4(L_1^2 + M^2) + \omega^2\left(R_L^2 - \frac{2L_1}{C_1}\right) + \frac{1}{C_1^2} = 0 \tag{12}$$

Where $\vec{U}_1$ is an output voltage vector of the inverter circuit, and $\vec{I}_1$ is a current vector of the transmitting unit 10, and $Z_1$ is an impedance value of the equivalent series impedance of the capacitor $C_1$ and the self-inducting $L_1$, and $\omega$ is the angular frequency of the resonance, and M is an inductance value of the mutual inductance of the transmitting coil 103 and the receiving coil 201, $C_1$ is the capacitance value of the capacitor, and $L_1$ is the inductance value of the self-inductance of the transmitting coil 103, and $U_2$ is an input voltage vector of the rectifier circuit, and $\vec{I}_2$ is an output current vector of the receiving unit 20, and $R_L$ is an equivalent load resistance value.

According to Equation (12), it can be seen that by designing different distances between the transmitting coil 103 and the receiving coil 201 and different loads coupled to the rectifier circuit 203, when satisfying $$\left(R_L^2 - \frac{2L_1}{C_1}\right)^2 - 4\times(L_1^2 + M^2)\times\frac{1}{C_1^2} > 0,$$

it can make the resonant network have three resonant frequencies which are the third resonant frequency (a low bifurcation frequency), the first resonant frequency (a natural resonant frequency) and the second resonant frequency (a high bifurcation frequency). The second resonant frequency is higher than the first resonant frequency and the first resonant frequency is higher than the third resonant frequency, as shown in FIG. 6. The control unit 40 controls the operating frequency (i.e., the switching frequency) of the inverter circuit 101 to be in the vicinity of the high bifurcation frequency, i.e., the operating frequency is higher than the second resonant frequency, or equal to the second resonant frequency, or lower than the second resonant frequency and higher than the first resonant frequency so that the voltage-and-current phase difference is equal to the preset phase difference. In this case, the operating frequency of the inverter circuit 101 is in the vicinity of the high bifurcation frequency, the capacitors $C_1$ and $C_2$ and the self-inductance $L_1$ of the transmitting coil 103 and the self-inductance $L_2$ of the receiving coil 201 present certain impedance, rather than being regarded as equivalent short circuit. The current of the transmitting coil 103 satisfies the following equation:

$$I_1 = \left| \frac{\vec{U_2} + \vec{I_2}Z_2}{j\omega M} \right| \quad (13)$$

Where $\vec{U_2}$ represents the input voltage vector of the rectifier circuit, and $\vec{I_2}$ represents the output current vector of the receiving unit 20, $Z_2$ is the impedance value of the equivalent series impedance of the capacitor $C_2$ and the self-inductance $L_2$, and the calculation equations of $Z_2$ and $\vec{I_2}$ as follows:

$$Z_2 = j\omega L_2 + \frac{1}{j\omega C_2} \quad (14)$$

$$\vec{I_2} = \frac{\vec{U_2}}{R_L} \quad (15)$$

When the output voltage of the wireless power transmission apparatus is fixed, by decreasing the output power, i.e., increasing $R_L$, decrease the output current. The current $I_1$ of the transmitting unit 10 can be reduced, thereby reducing the thermal stress of the transmitting unit 10.

In the present embodiment, during the operation of the wireless power transmission apparatus, the control unit 40 acquires the voltage-and-current phase difference of the transmitting unit 10, and controls, according to the voltage-and-current phase difference and the preset phase difference, the operating frequency of the inverter circuit 101 which is higher than the second resonant frequency, or equal to the second resonant frequency, or lower than the second resonant frequency and higher than the first resonant frequency so that the voltage-and-current phase difference is equal to the preset phase difference. The current or voltage of the transmitting coil 103 can be reduced with the decrease of the output signal of the wireless power transmission apparatus. The output signal of the wireless power transmission apparatus is reduced to achieve the purpose of reducing the heat generation of the apparatus.

The control unit 40 generates a power derating signal according to the detection signal and controls, according to the power derating signal, the power detection value, and the power reference signal, the power regulation unit 30 to regulate the output signal of the wireless power transmission apparatus, so that the wireless power transmission apparatus operates under an operating condition of reducing output power, thereby reducing the current or voltage of the transmitting unit 10, reducing the loss, and improving the efficiency of the apparatus and the thermal stress.

Figure 7:
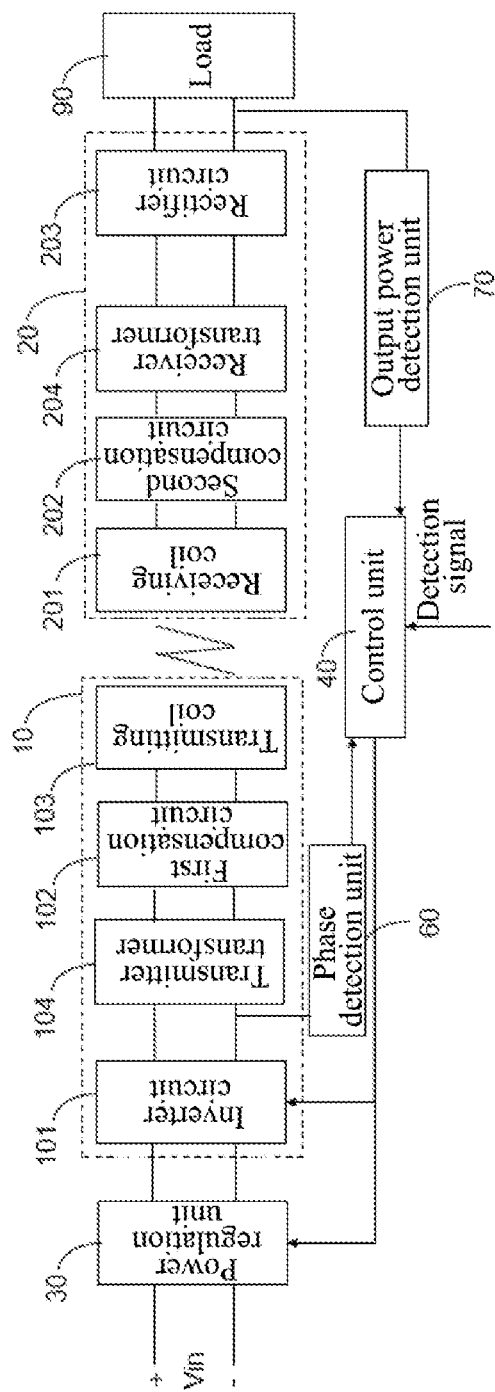
FIG. 7 is a schematic diagram of a wireless power transmission apparatus provided in another embodiment of the present application.

As shown in FIG. 7, a wireless power transmission apparatus provided in another embodiment of the present application includes a transmitting unit 10, a receiving unit 20, a power regulation unit 30, a phase detection unit 60, an output power detection unit 70, and a control unit 40.

The transmitting unit 10 includes: an inverter circuit 101, a transmitter transformer 104, a first compensation circuit 102, and a transmitting coil 103. In the present embodiment, the transmitter transformer 104 is coupled between the inverter circuit 101 and the first compensation circuit 102, and the first compensation circuit 102 is coupled to the transmitting coil 103. In another embodiment, the first compensation circuit 102 is coupled between the inverter circuit 101 and the transmitter transformer 104, and the transmitter transformer 104 is coupled to the transmitting coil 103.

The receiving unit 20 includes: a receiving coil 201, a second compensation circuit 202, a receiver transformer 204, and a rectifier circuit 203. In the present embodiment, the second compensation circuit 202 is coupled between the receiving coil 201 and the receiver transformer 204, and the receiver transformer 204 is coupled to the rectifier circuit 203. In another embodiment, the receiver transformer 204 is coupled between the receiving coil 201 and the second compensation circuit 202, and the second compensation circuit 202 is coupled to the rectifier circuit 203. The rectifier circuit 203 is coupled to the load 90.

It should be noted that the transmitting unit 10 may include the transmitter transformer 104, and the receiving unit 20 may not include the receiver transformer 204; or, the transmitting unit 10 may not include the transmitter transformer 104, and the receiving unit 20 may include the receiver transformer 204. Adding the transmitter transformer 104 to the transmitting unit 10, or adding the receiver transformer to the receiving unit 20 is determined as required. Connections of the transmitter transformer 104 or the receiver transformer 204 to other circuits can refer to the foregoing description.

The power regulation unit 30 is coupled between the input terminal and the transmitting unit 10 of the wireless power transmission apparatus to receive the electrical energy Vin.

The control unit 40 is configured to acquire the voltage-and-current phase difference of the transmitting unit 10, the detection signal and the power detection value of the wireless power transmission apparatus. The operating frequency of the inverter circuit 101 is controlled according to the voltage-and-current phase difference and the preset phase difference so that the voltage-and-current phase difference is equal to the preset phase difference. The operating frequency is in the vicinity of the second resonant frequency. That is, the control unit 40 is configured to compare the voltage-and-current phase difference and the preset phase difference, and generate a control signal of the inverter circuit 101 according to a comparison result of the voltage-and-current phase difference and the preset phase difference, the control signal is configured to control the operating frequency of the inverter circuit 101 so that the voltage-and-current phase difference of the transmitting unit 10 is equal to the preset phase difference.

The control unit 40 is further configured to generate a power derating signal according to the detection signal and control, according to the power derating signal, the power detection value and the power reference signal, the power regulation unit 30 to regulate the output signal of the wireless power transmission apparatus. Specifically, the control unit 40 receives the detection signal and generates the power derating signal when the detection signal reaches the preset value, that is, the power derating signal is generated only when the detection signal satisfies the preset condition. The preset value may be set internally by the control unit 40 or provided by an external circuit. The control unit 40 then generates a power regulation signal according to the power derating signal and the power reference signal. The power reference signal is the output power signal of the wireless power transmission apparatus under rated conditions. The power reference signal may be provided by an external circuit. The external circuit may receive a voltage instruction and a current instruction provided by the charging protocol and calculate the power reference signal according to the voltage instruction and the current instruction. The external circuit may receive the voltage and current instructions provided by an external battery system and calculate the power reference signal according to the voltage and current instructions. The power reference signal may be set internally by the control unit 40. The control unit 40 compares the power regulation signal and the power detection value and generates the control signal according to the comparison result to control the power regulation unit 30 to regulate the output signal of the wireless power transmission apparatus. The output signal includes one or more of an output voltage, an output current, or an output power.

In the preset embodiment, the current of the transmitting unit 10 decreases with the decrease of the output signal; or the voltage of the transmitting unit 10 decreases with the decrease of the output signal.

The wireless power transmission apparatus described in the above embodiment is capable of operating under an operating condition of reducing output power, thereby reducing the current or voltage in the transmitting unit 10, reducing the loss, reducing the thermal stress of the wireless power transmission apparatus, and ensuring continuous operation of the wireless power transmission apparatus.

The phase detection unit 60 is coupled to the transmitting unit 10 and the control unit 40, and is configured to acquire the voltage phase signal and the current phase signal of the transmitting unit 10, and calculate the voltage-and-current phase difference according to the voltage phase signal and the current phase signal.

Figure 8:
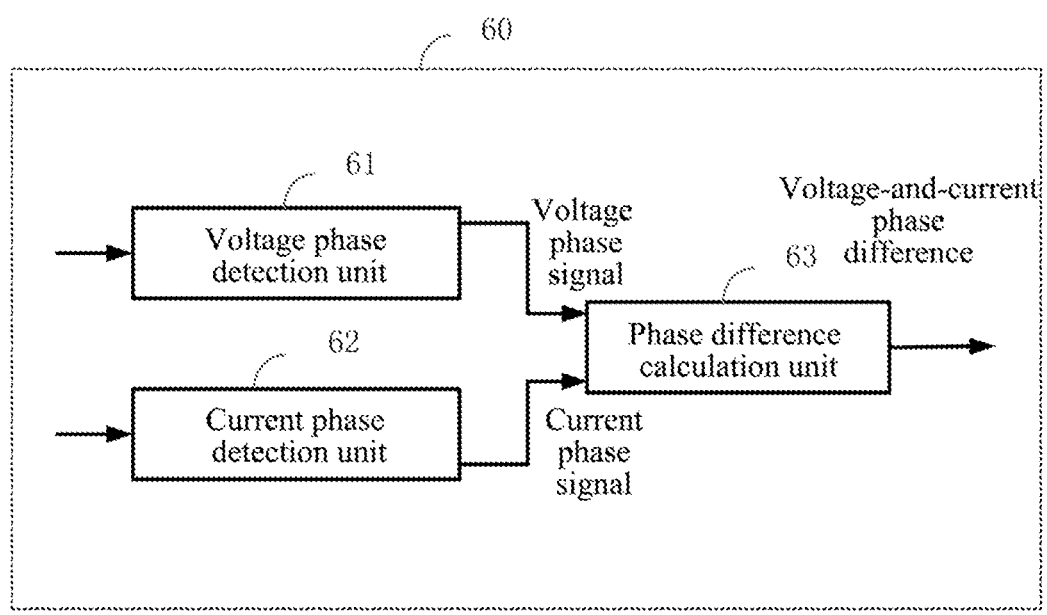
FIG. 8 is a schematic diagram of a phase detection unit provided in an embodiment of the present application.

In conjunction with FIGS. 7 and 8, the phase detection unit 60 further includes a voltage phase detection unit 61, a current phase detection unit 62, and a phase difference calculation unit 63. The voltage phase detection unit 61 is coupled to the output terminal of the inverter circuit 101 and is configured to detect the voltage phase signal of the transmitting unit 10, i.e., the voltage phase signal output from the inverter circuit 101. The current phase detection unit 62 is coupled between the first compensation circuit 102 and the inverter circuit 101, or between the first compensation circuit 102 and the transmitting coil 103, and configured to detect the current phase signal of the transmitting unit 10. The phase difference calculation unit 63 is coupled to the voltage phase detection unit 61 and the current phase detection unit 62, respectively, and configured to acquire the voltage phase signal and the current phase signal, and calculate the voltage-and-current phase difference according to the voltage phase signal and the current phase signal.

It should be noted that the phase detection unit 60 may include a voltage phase detection unit and a current detection unit, the voltage detection unit being coupled to the output of the inverter circuit 101 for detecting the voltage phase signal of the transmitting unit; the current detection unit being coupled between the first compensation circuit and the inverter circuit or between the first compensation circuit and the transmitting coil for detecting the current phase signal of the transmitting unit; the control unit 40 acquires the voltage phase signal and the current phase signal and calculates the voltage-and-current phase difference according to the voltage phase signal and the current phase signal.

In the wireless power transmission apparatus provided in an embodiment of the present application, the voltage-and-current phase difference of the transmitting unit is calculated in real time by the phase detection unit to enable the control unit to control the operating frequency of the inverter circuit, so that the voltage-and-current phase difference is equal to the preset phase difference. According to the power reference signal and the detected output power of the receiving unit, the wireless power transmission apparatus is enabled to operate under an operating condition of reducing output power, and the current of the transmitting coil is reduced, and the heat generation of the wireless power transmission apparatus is thus reduced.

The output power detection unit 70 is coupled to the output terminal of the wireless power transmission apparatus and the control unit 40, and configured to detect the output power of the wireless power transmission apparatus and provide the power detection value. In the present embodiment, the wireless power transmission apparatus may include an output current detection unit and an output voltage detection unit; the output current detection unit is coupled to the output terminal of the wireless power transmission apparatus and the control unit 40, and configured to detect the output current and provide the current detecting value; the voltage detection unit is coupled to the output terminal of the wireless power transmission apparatus and the control unit 40, and configured to detect the output voltage and provide the voltage detection value. The control unit 40 acquires the current detection value and the voltage detection value, and acquires the power detection value according to the current detection value and the voltage detection value.

Figure 9:
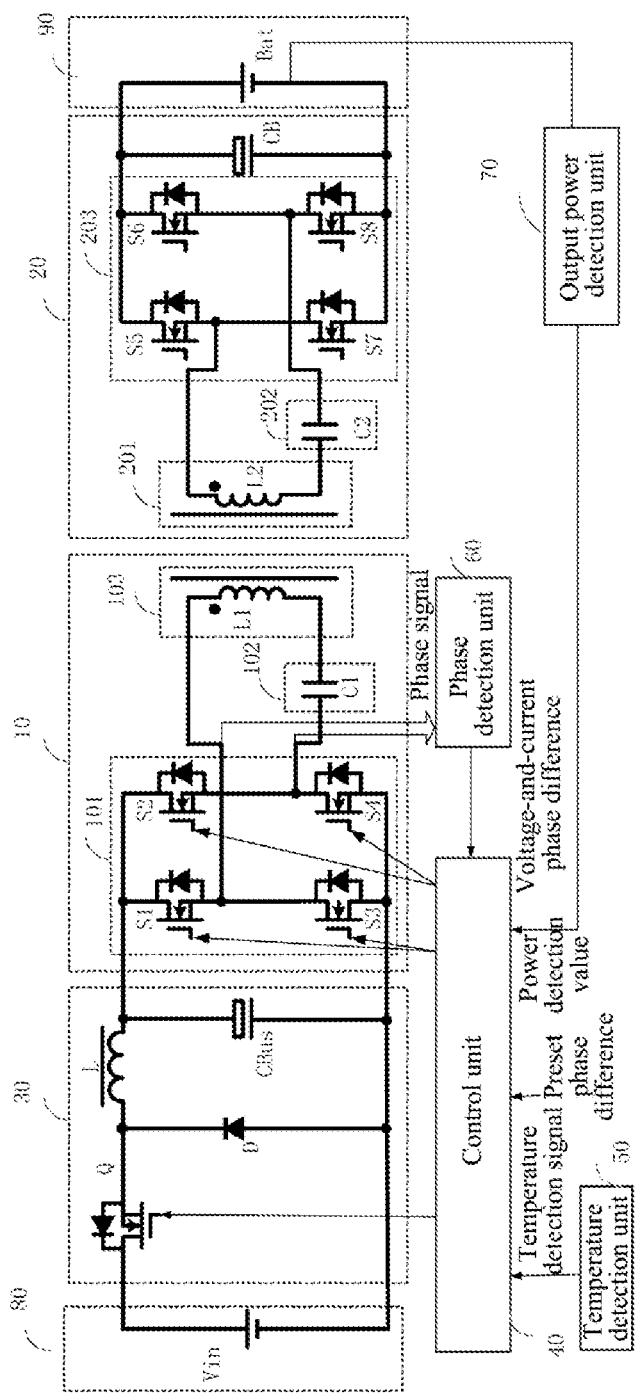
FIG. 9 is a schematic diagram of a circuit structure of a wireless power transmission apparatus provided in another embodiment of the present application.

The following is described in conjunction with a specific circuit diagram of the wireless power transmission apparatus, as shown in FIG. 9, the wireless power transmission apparatus includes a transmitting unit 10, a receiving unit 20, a power regulation unit 30, a phase detection unit 60, a temperature detection unit 50, an output power detection unit 70, and a control unit 40.

The transmitting unit 10 includes: an inverter circuit 101, a first compensation circuit 102, and a transmitting coil 103. In the present embodiment, the first compensation circuit 102 is coupled between the inverter circuit 101 and the transmitting coil 103.

The receiving unit 20 includes a receiving coil 201, a second compensation circuit 202, a receiver transformer 204, and a rectifier circuit 203. In the present embodiment, the second compensation circuit 202 is coupled between the receiving coil 201 and the rectifier circuit 203.

The power regulation unit 30 is coupled between an input power supply 80 and the inverter circuit 101. The input power supply 80 may be a direct current power supply Vin. The control unit 40 is coupled to the power regulation unit 30 and the inverter circuit 101, respectively.

Specifically, the power regulation unit 30 is a buck circuit that includes a switch Q, a diode D, an inductor L, and a bus capacitor $C_{Bus}$. A first end of the switch Q is connected to one end of the direct current power supply Vin, and a second end of the switch Q is connected to one end of the inductor L and the cathode of the diode D, respectively, and two ends of the bus capacitor $C_{Bus}$ are connected to the other end of the inductor L and the anode of the diode D, respectively. The anode of the diode D is connected to the other end of the direct current power supply Vin, and the control end of the switch Q is connected to the control unit 40. The inverter circuit 101 is a full-bridge inverter circuit, and the input terminal of the full-bridge inverter circuit is connected to the bus capacitor $C_{Bus}$. The first compensation circuit 102 is a capacitor $C_1$ which is connected in series between the output terminal of the full-bridge inverter circuit and the transmitting coil 103.

The rectifier circuit 203 of the receiving unit 20 is a full-bridge rectifier circuit. The second compensation circuit 202 is a capacitor $C_2$ which is connected in series between the receiving coil 201 and the input terminal of the full-bridge rectifier circuit, and the output terminal of the full-bridge rectifier circuit is connected to a load Bat.

The temperature detection unit 50 is coupled to the control unit 40 and is configured to detect an ambient temperature or temperatures of components in the wireless power transmission apparatus and provide a temperature signal.

The phase detection unit 60 is coupled to the output terminal of the full-bridge inverter circuit and the control unit 40, and configured to provide the voltage-and-current phase difference.

The output power detection unit 70 is coupled to the output terminal of the wireless power transmission apparatus and the control unit 40, and configured to provide the power detection value.

The control unit 40 is configured to receive the voltage-and-current phase difference provided by the phase detection unit 60, and control, according to the voltage-and-current phase difference and the preset phase difference, the operating frequency of the inverter circuit 101 so that the voltage-and-current phase difference is equal to the preset phase difference. That is, the control unit 40 is configured to compare the voltage-and-current phase difference and the preset phase difference, and generate a control signal of the inverter circuit 101 according to a comparison result of the voltage-and-current phase difference and the preset phase difference, and the control signal is configured to control the operating frequency of the inverter circuit 101 so that the voltage-and-current phase difference of the transmitting unit 10 is equal to the preset phase difference.

The control unit 40 is further configured to receive the temperature detection signal provided by the temperature detection unit 50 and compare the temperature signal with the preset temperature value, and generate a power derating signal when the temperature signal reaches a preset temperature value. The preset temperature value may be a rated operating temperature of the wireless power transmission apparatus or may also be a temperature limit value of internal components of the wireless power transmission apparatus. According to the power derating signal, the power detection value and the power reference signal, the operation of the switch Q of the power regulation unit 30 is controlled in order to regulate the output signal of the wireless power transmission apparatus.

In the present embodiment, the current of the transmitting unit 10 decreases with the decrease of the output signal; or the voltage of the transmitting unit 10 decreases with the decrease of the output signal.

The wireless power transmission apparatus described in the above embodiment is capable of operating under an operating condition of reducing the output power, thereby reducing the current or voltage in the transmitting unit 10, reducing the loss, reducing the thermal stress of the wireless power transmission apparatus, and ensuring continuous operation of the wireless power transmission apparatus.

Figure 10:
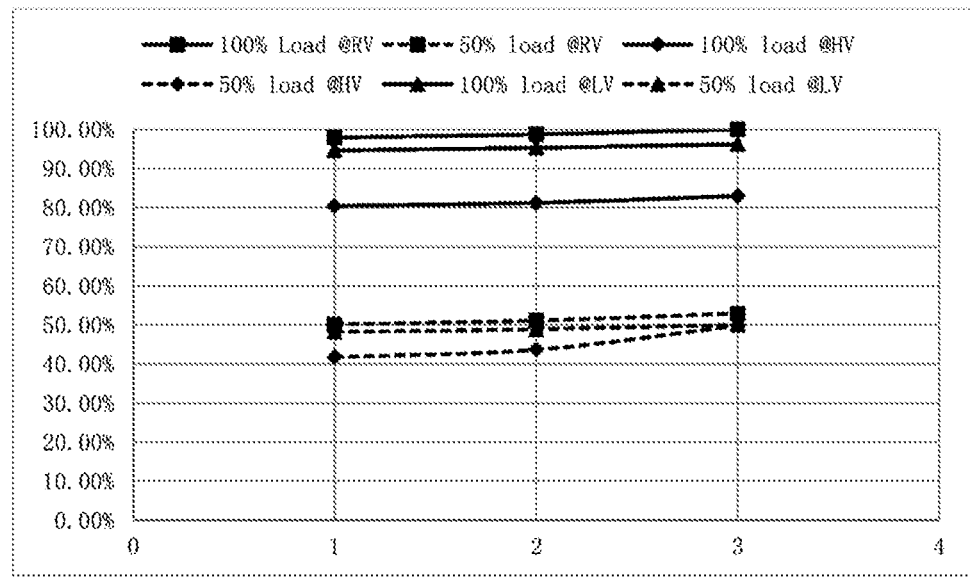
FIG. 10 is a schematic diagram of effects of a wireless power transmission apparatus provided in another embodiment of the present application.
Figure 11:
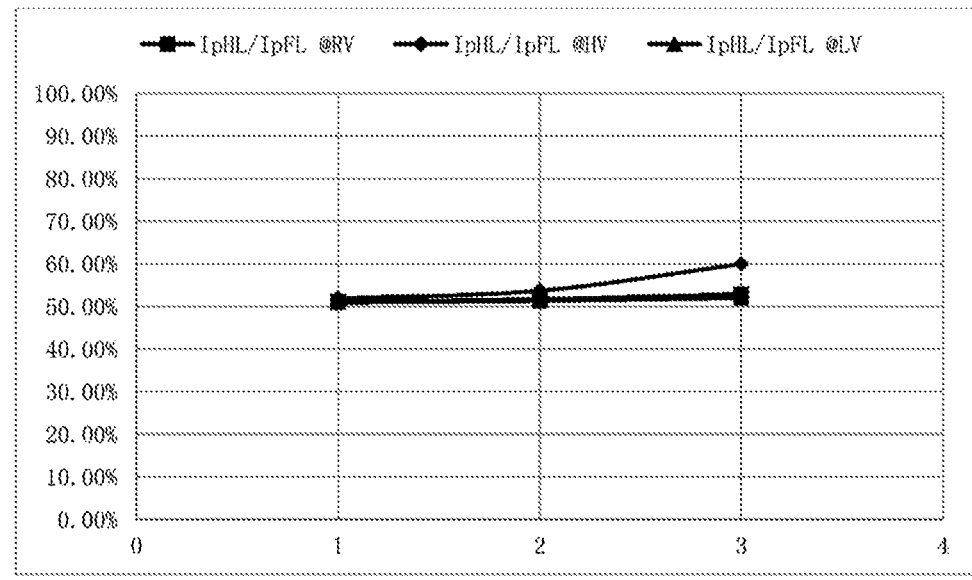
FIG. 11 is a schematic diagram of effects of a wireless power transmission apparatus provided in another embodiment of the present application.

When the preset phase difference of the wireless power transmission apparatus shown in FIG. 9 is taken to be a typical value of 15 degrees, effects shown in FIGS. 10 and 11 can be achieved. As shown in FIG. 10, the horizontal axis is an air gap distance between the transmitting coil and the receiving coil when the transmitting coil is well aligned with the receiving coil, and a larger value indicates a larger air gap distance. The vertical axis is a per-unit value of the current of the transmitting unit 10 (taking the maximum current of the transmitting unit as a baseline). 100% Load@RV indicates the current of the transmitting unit when the load is a full load and the output voltage is the typical voltage value. 50% Load@RV indicates the current of the transmitting unit when the load is a half load and the output voltage is the typical voltage value. 100% Load@HV indicates the current of the transmitting unit when the load is a full load and the output voltage is the maximum voltage. 50% Load@HV indicates the current of the transmitting unit when the load is a half load and the output voltage is the maximum voltage. 100% Load@LV indicates the current of the transmitting unit when the load is a full load and the output voltage is the minimum voltage. 50% Load@LV indicates the current of the transmitting unit when the load is a half load and the output voltage is the minimum voltage. As shown in FIG. 11, IpHL/IpFL@HV indicates the ratio of the current of the transmitting unit when the output voltage is the maximum voltage and the load is a half load to the current of the transmitting unit when the output voltage is the maximum voltage and the load is a full load. IpHL/IpFL@LV indicates the ratio of the current of the transmitting unit when the output voltage is the minimum voltage and the load is a half load to the current of the transmitting unit when the output voltage is the minimum voltage and the load is a full load. IpHL/IpFL@RV indicates the ratio of the current of the transmitting unit when the output voltage is the typical voltage and the load is a half load to the current of the transmitting unit when the output voltage is the typical voltage and the load is a full load.

As can be seen from FIGS. 10 and 11, under different air gap distances and different output voltages, the current of the transmitting unit 10 can be reduced when the output power is reduced, and when the output power is reduced by 50%, the current of the transmitting unit 10 can also be reduced about 50%, and the loss of the transmitting coil 103 can be reduced by about 75%.

Figure 12:
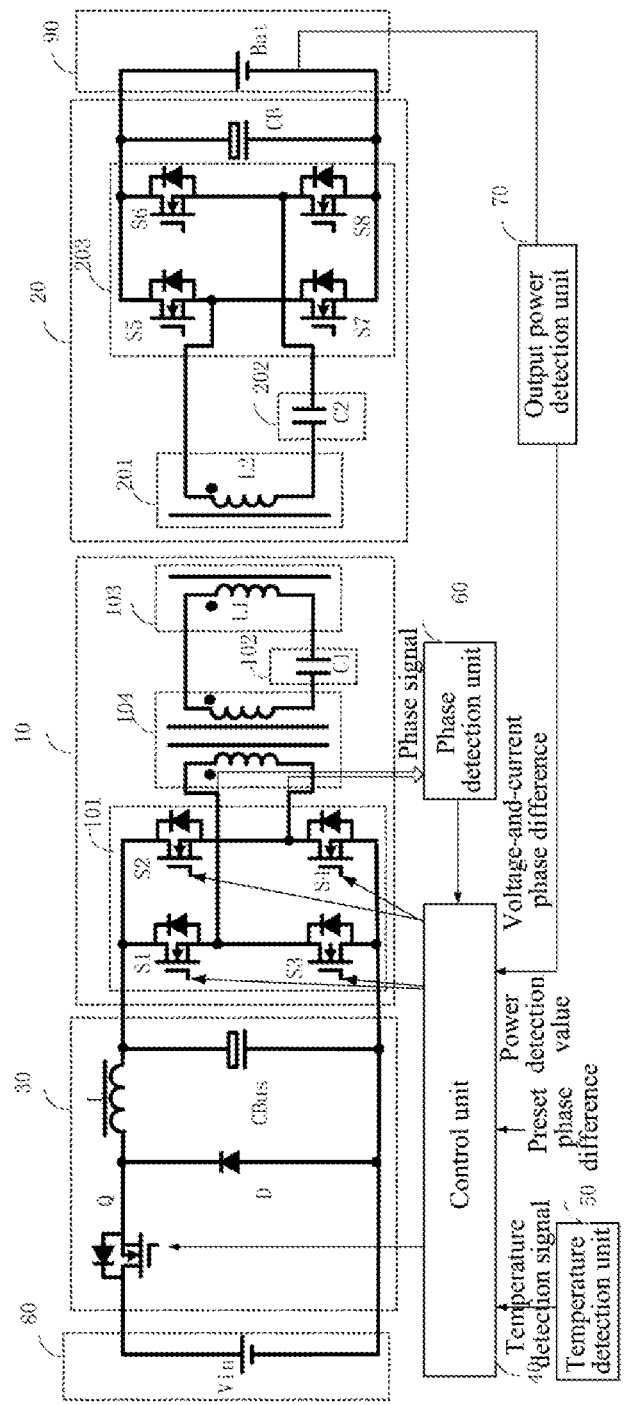
FIG. 12 is a schematic diagram of a circuit structure of a wireless power transmission apparatus provided in another embodiment of the present application.

The circuit structure in the wireless power transmission apparatus shown in FIG. 12 is mostly identical to the circuit structure in the wireless power transmission apparatus shown in FIG. 9, and the acquisition and control method of the detection signal are also the same, and the same content is not repeated herein. The difference between FIG. 12 and FIG. 9 lies in that the transmitter transformer 104 is added to the transmitting unit 10 of the wireless power transmission apparatus shown in FIG. 9. The transmitter transformer 104 is coupled between the full-bridge inverter circuit and the capacitor $C_1$. The transmitter transformer 104 may raise or decrease the voltage so that the ratio of turn of the loosely coupled transformer formed by the transmitting coil 103 and the receiving coil 201 may be closer or even the same to optimize the performance of the loosely coupled transformer and simplify the design of the loosely coupled transformer.

Figure 13:
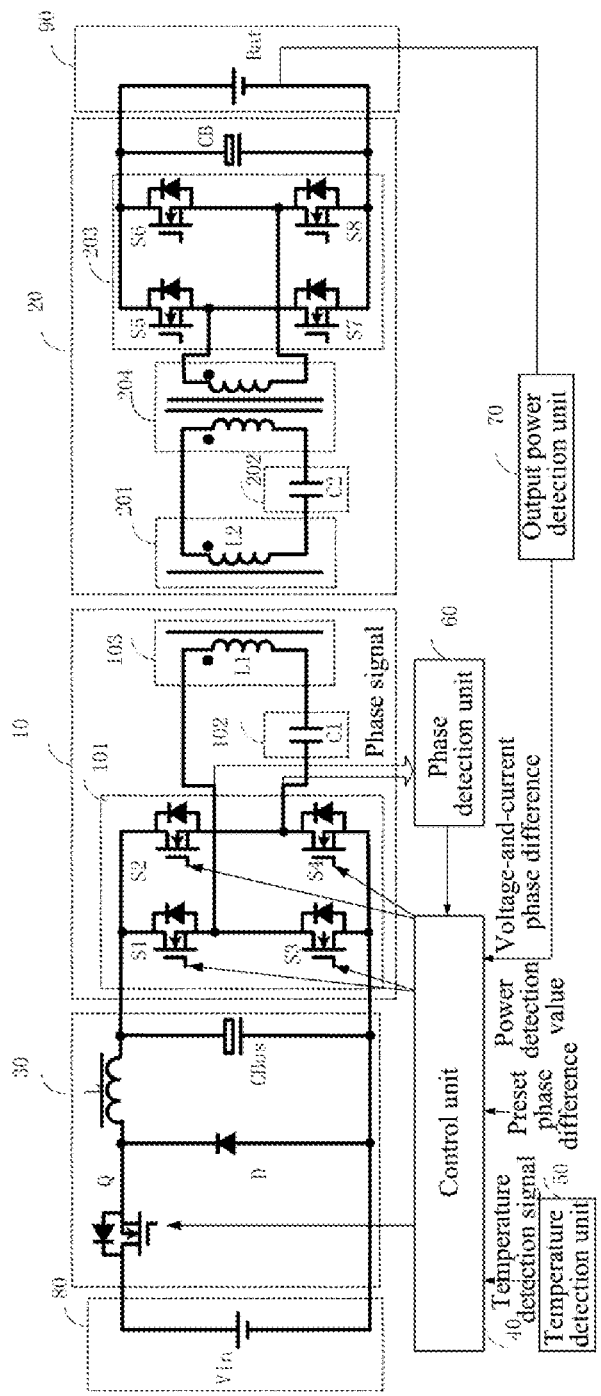
FIG. 13 is a schematic diagram of a circuit structure of a wireless power transmission apparatus provided in another embodiment of the present application.

The circuit structure in the wireless power transmission apparatus shown in FIG. 13 is mostly identical to the circuit structure in the wireless power transmission apparatus shown in FIG. 9, and the acquisition and control method of the detection signal acquisition are also the same, and the same content is not repeated herein. The difference between FIG. 13 and FIG. 9 lies in that the receiver transformer 204 is added to the receiving unit 20 of the wireless power transmission apparatus shown in FIG. 9. The receiver transformer 204 is coupled between the full-bridge rectifier circuit and the capacitor $C_2$. The receiver transformer 204 may raise or decrease the voltage so that the ratio of turn of the loosely coupled transformer formed by the transmitting coil 103 and the receiving coil 201 may be closer or even the same to optimize the performance of the loosely coupled transformer and simplify the design of the loosely coupled transformer.

Figure 14:
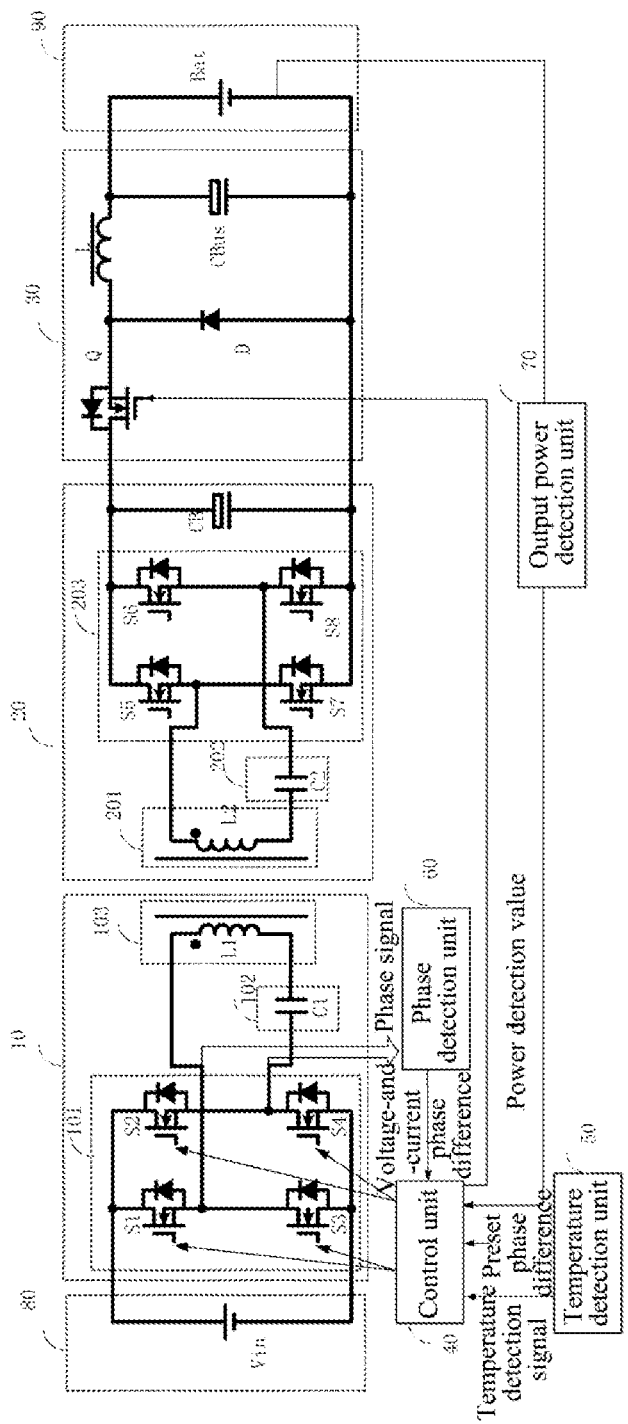
FIG. 14 is a schematic diagram of a circuit structure of a wireless power transmission apparatus provided in another embodiment of the present application.

The circuit structure in the wireless power transmission apparatus shown in FIG. 14 is mostly identical to the circuit structure in the wireless power transmission apparatus shown in FIG. 9, and the acquisition and control method of the detection signal acquisition are also the same, and the same content is not repeated herein. The difference between FIG. 14 and FIG. 9 lies in that the power regulation unit 30 shown in FIG. 9 is moved from the input terminal of the full-bridge inverter circuit to the output terminal of the full-bridge rectifier circuit. The first end of the switch Q and the anode of the diode D of the power regulation unit 30 are connected to the two ends of the output capacitor $C_B$ of the full-bridge rectifier circuit, respectively, and the bus capacitor $C_{Bus}$ of the power regulation unit 30 is connected in parallel at both ends of the load Bat.

Figure 15:
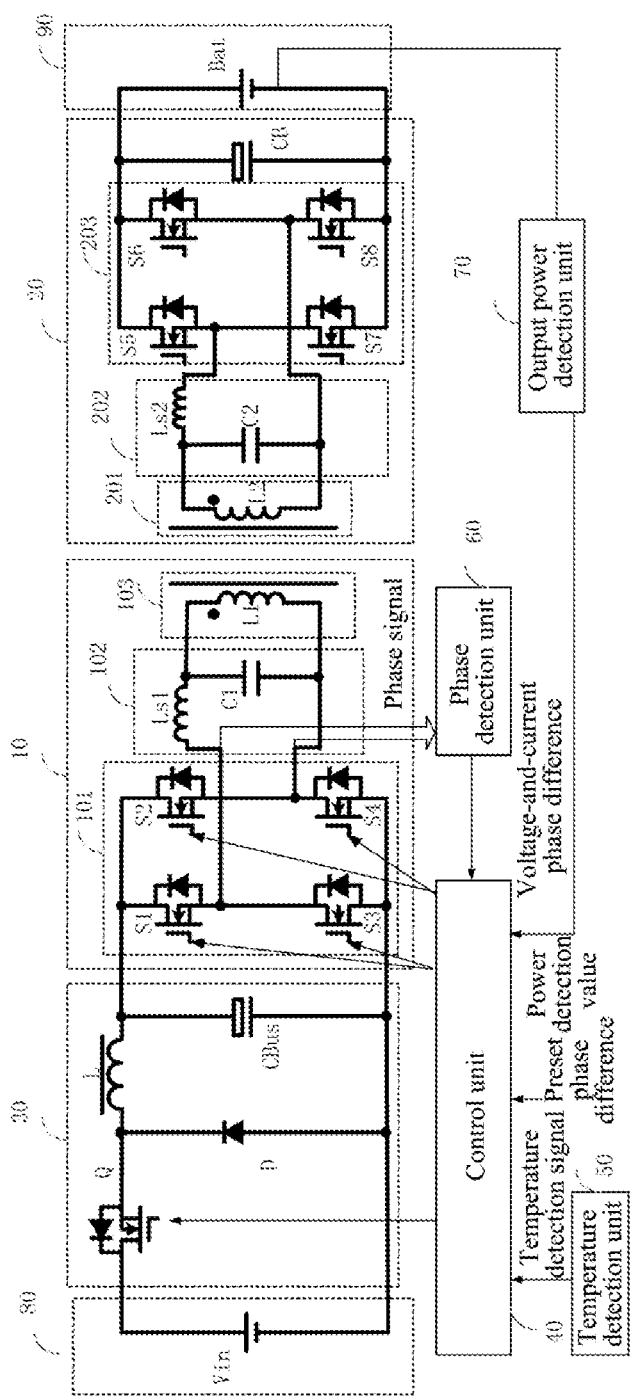
FIG. 15 is a schematic diagram of a circuit structure of a wireless power transmission apparatus provided in another embodiment of the present application.

The circuit structure in the wireless power transmission apparatus shown in FIG. 15 is mostly identical to the circuit structure in the wireless power transmission apparatus shown in FIG. 9, and the acquisition and control method of the detection signal acquisition are also the same, and the same content is not repeated herein. The difference between FIG. 15 and FIG. 9 lies in that the first compensation circuit 102 and the second compensation circuit 202. The first compensation circuit 102 includes an inductor $L_{s1}$ and a capacitor $C_1$, and the second compensation circuit 202 includes an inductor $L_{s2}$ and a capacitor $C_2$. The inductor $L_{s1}$ is connected in series between the full-bridge inverter circuit and the transmitting coil 103, and the capacitor $C_1$ is connected in parallel to both ends of the transmitting coil 103. The inductor $L_{s2}$ is connected in series between the full-bridge rectifier circuit and the receiving coil 201, and capacitor $C_2$ is connected in parallel to both ends of the receiving coil 201.

Figure 16:
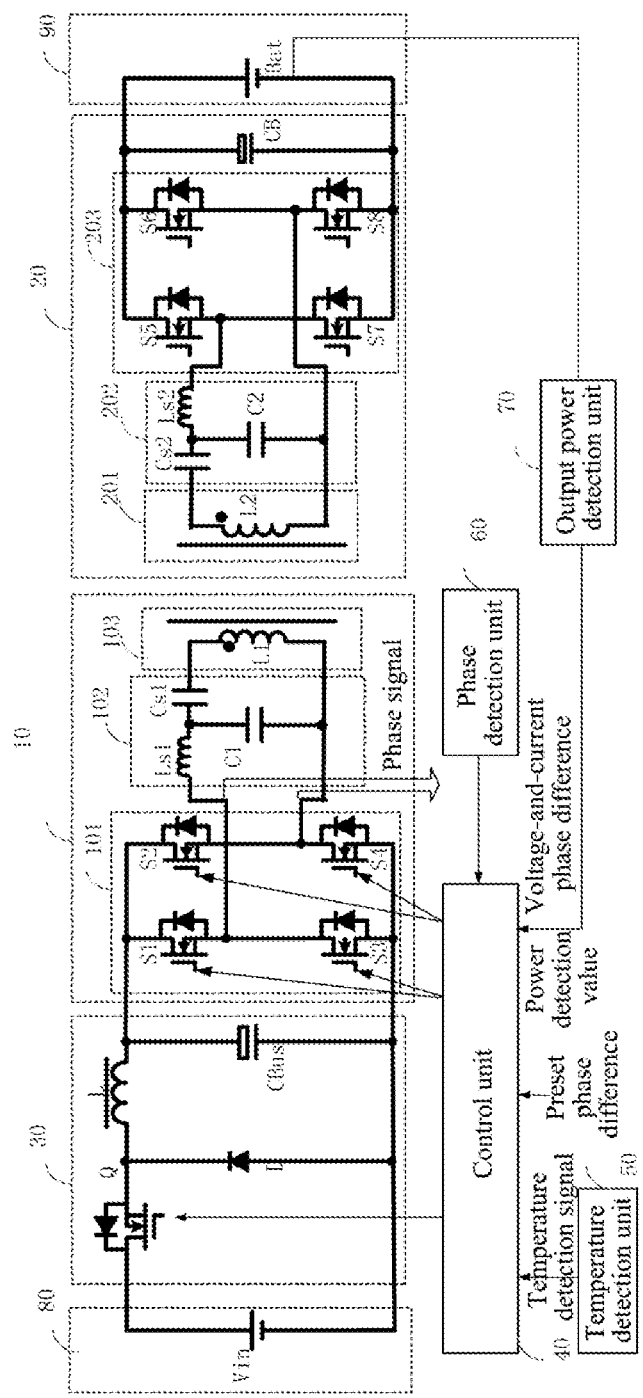
FIG. 16 is a schematic diagram of a circuit structure of a wireless power transmission apparatus provided in another embodiment of the present application.

The circuit structure in the wireless power transmission apparatus shown in FIG. 16 is mostly identical to the circuit structure in the wireless power transmission apparatus shown in FIG. 9, and the acquisition and control method of the detection signal acquisition are also the same, and the same content is not repeated herein. The difference between FIG. 16 and FIG. 9 lies in that the first compensation circuit 102 and the second compensation circuit 202. The first compensation circuit 102 includes an inductor $L_{s1}$, a capacitor $C_1$ and a capacitor $C_{s1}$, and the second compensation circuit 202 includes an inductor $L_{s2}$, a capacitor $C_2$ and a capacitor $C_{s2}$. One end of the inductor $L_{s1}$ is connected to one output terminal of the full-bridge inverter circuit, and the other end of the inductor $L_{s1}$ is connected to one end of the capacitor $C_1$ and one end of the capacitor $C_{s1}$, and the other end of the capacitor $C_{s1}$ is connected to one end of the transmitting coil 103, and the other end of the transmitting coil 103 is connected to the other end of the capacitor C1 and the other output terminal of the full bridge inverter circuit. One end of the receiving coil 201 is connected to one end of the capacitor $C_{s2}$, and the other end of the capacitor $C_{s2}$ is connected to one end of the inductor $L_{s2}$ and one end of the capacitor $C_2$, respectively, and the other end of the inductor $L_{s2}$ is connected to one input terminal of the full-bridge rectifier circuit, and the other end of the receiving coil 201 is connected to the other end of the capacitor $C_2$ and the other input terminal of the full-bridge rectifier circuit, respectively.

Figure 17:
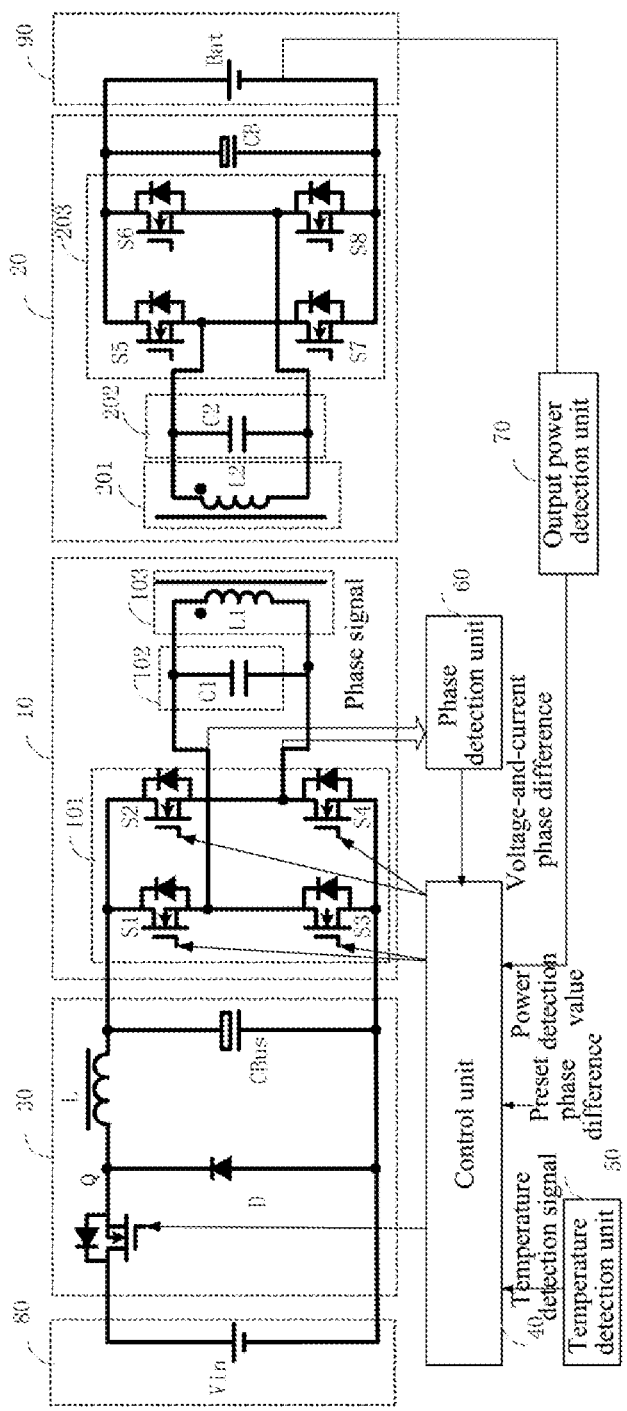
FIG. 17 is a schematic diagram of a circuit structure of a wireless power transmission apparatus provided in another embodiment of the present application.

The circuit structure in the wireless power transmission apparatus shown in FIG. 17 is mostly identical to the circuit structure in the wireless power transmission apparatus shown in FIG. 9, and the acquisition and control method of the detection signal acquisition are also the same, and the same content is not repeated herein. The difference between FIG. 17 and FIG. 9 lies in that the first compensation circuit 102 and the second compensation circuit 202. The first compensation circuit 102 includes a capacitor $C_1$ and the second compensation circuit 202 includes a capacitor $C_2$. The capacitor $C_1$ connected in parallel to both ends of the transmitting coil 103 and the capacitor $C_2$ connected in parallel to both ends of the receiving coil 201.

Figure 18:
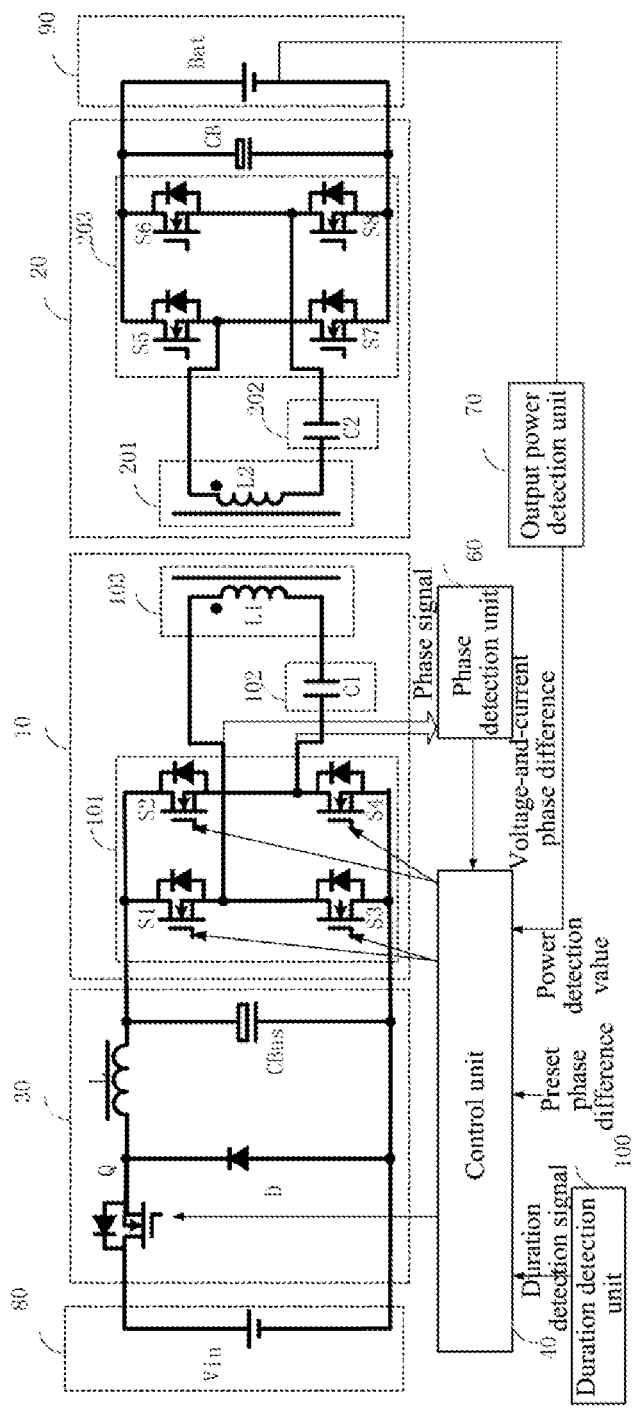
FIG. 18 is a schematic diagram of a circuit structure of a wireless power transmission apparatus provided in another embodiment of the present application.

The circuit structure in the wireless power transmission apparatus shown in FIG. 18 is mostly identical to the circuit structure in the wireless power transmission apparatus shown in FIG. 9, and the acquisition and control method of the detection signal acquisition are also the same, and the same content is not repeated herein. The difference between FIG. 18 and FIG. 9 lies in the acquisition of the detection signal. As shown in FIG. 18, the wireless power transmission apparatus includes a duration detection unit 100 which may be a timer in the control unit 40 or an independent timing circuit coupled to the control unit 40 to provide a duration signal. The duration signal indicates the operating duration of the wireless power transmission apparatus. The control unit 40 receives the duration signal and compares the duration signal with the preset duration signal, and generates the power derating signal when the duration signal reaches the preset duration signal.

Figure 19:
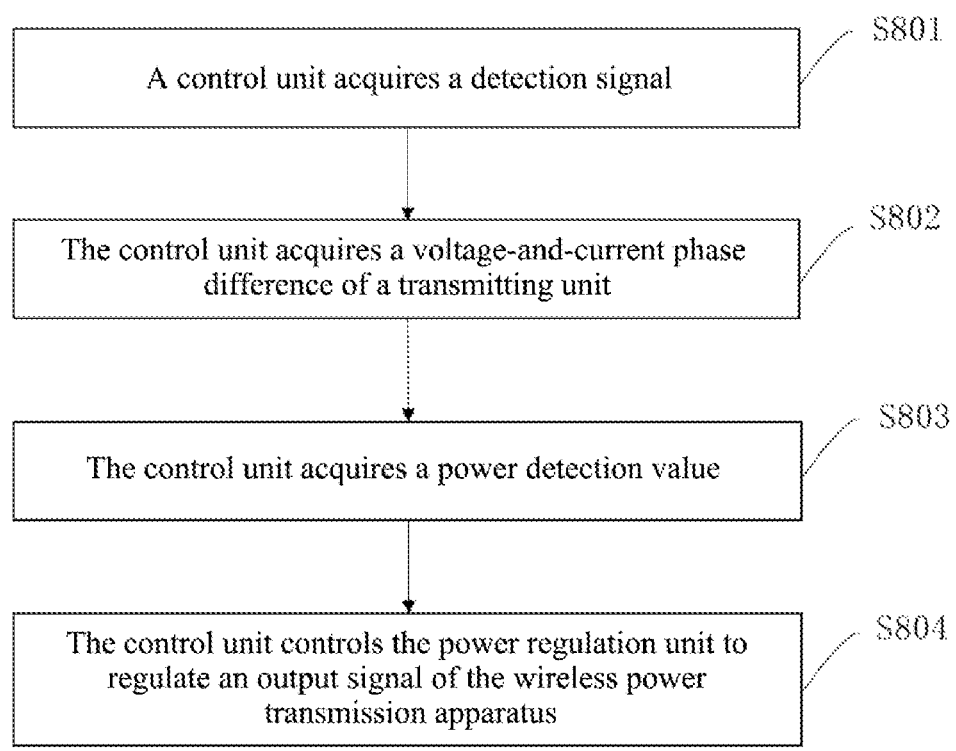
FIG. 19 is a schematic flowchart of a control method of a wireless power transmission apparatus provided in another embodiment of the present application.

As shown in FIG. 19, a control method of the wireless power transmission apparatus is provided in another embodiment of the present application, the method may be applied to the wireless power transmission apparatus in the above embodiment. Where the method includes the steps as follows:

S801, a control unit acquires a detection signal.

Where the detection signal may be a temperature of an internal component of the apparatus or a temperature of the environment where the apparatus is located. The detection signal may also be the duration signal as the duration of the operation of the apparatus.

S802, the control unit acquires a voltage-and-current phase difference of a transmitting unit.

Where the voltage-and-current phase difference of the transmitting unit may be acquired in the following manner: acquiring a voltage phase signal of the transmitting unit and a current phase signal of the transmitting unit; and calculating the voltage-and-current phase difference according to the voltage and current phase signals.

S803, the control unit acquires a power detection value.

Where an output power of an output terminal of the transmitting unit may be acquired directly through acquisition of a sensor. The power detection value can also be acquired through calculation. The power detection value can be acquired in the following manner: acquiring a current detection value and a voltage detection value; and calculating the power detection value according to the current detection value and the voltage detection value.

S804, the control unit controls an operating frequency of an inverter circuit according to the voltage-and-current phase difference signal and a preset phase difference signal in such a manner that the voltage-and-current phase difference is equal to the preset phase difference signal. The control unit generates a derating signal according to the detection signal, and controls, according to the derating signal, the power detection value and a power reference signal, the power regulation unit to regulate an output signal of the wireless power transmission apparatus.

The control unit controls the operating frequency of the inverter circuit according to the voltage-and-current phase difference and the preset phase difference. The operating frequency of the inverter circuit is higher than the second resonant frequency, or, equal to the second resonant frequency, or less than the second resonant frequency and higher than the first resonant frequency, so that the voltage-and-current phase difference of the transmitting unit is equal to the preset phase difference signal.

The control unit generates the derating signal according to the detection signal and controls the power regulation unit to regulate an output signal of the wireless power transmission apparatus according to the power derating signal, the power detection value and a power reference signal, specifically includes: the control unit generates the power derating signal when the detection signal reaches a preset value, and provides a power regulation signal according to the power derating signal and the power reference signal after the power derating signal is acquired. The control unit controls, according to the power regulation signal and the power detection value, the power regulation unit to reduce the output signal, thus reducing the current of the transmitting unit or the voltage of the transmitting unit. In this way, the heat generation of the wireless power transmission apparatus is reduced and the rate of temperature rising is reduced, thus enabling the wireless power transmission apparatus to operate beyond the rated operating conditions.

As a specific implementation, the detection signal is a temperature signal and the preset value is a preset temperature value. The control unit generates the power derating signal when the temperature signal reaches the preset temperature value. The preset temperature value may be a rated operating temperature of the wireless power transmission apparatus or may be a limiting temperature of the internal components of the apparatus. The output signal of the apparatus is then controlled according to the power derating signal and other information, so that the wireless power transmission apparatus can operate beyond the preset temperature.

As another specific implementation of the control unit, the detection signal is a duration signal and the preset value is a preset duration signal. The control unit is configured to generate the derating signal when the duration signal reaches the preset duration signal. The preset duration signal is a rated operating duration of the wireless power transmission apparatus. The output signal of the apparatus is then controlled according to the derating signal and other information, thus enabling the wireless power transmission apparatus to operate beyond the preset duration.

In the temperature control method provided in the embodiment of the present application, controlling the operating frequency of the inverter circuit to make the voltage-and-current phase difference of the transmitting unit be equal to the preset phase difference, and the current of the transmitting coil can be controlled by the output signal of the wireless power transmission apparatus. The output signal of the wireless power transmission apparatus can then be controlled and regulated so that the wireless power transmission apparatus can operate under an operating condition reducing output power, in this way, the loss is reduced, the heat generation of the apparatus is reduced, thus enabling the wireless power transmission apparatus to operate beyond the rated operating condition.

Finally, it should be noted that the foregoing embodiments are merely intended for describing the technical solutions of the present application rather than limiting the present application. Although the present application is described in detail with reference to the foregoing embodiments, persons of ordinary skill in the art should understand that they may still make modifications to the technical solutions described in the foregoing embodiments or make equivalent substitutions to some technical features thereof, without departing from the spirit and scope of the technical solutions of embodiments of the present application.

What is claimed is:

1. A wireless power transmission apparatus, comprising:
    a transmitting unit, comprising an inverter circuit, a first compensation circuit and a transmitting coil, the first compensation circuit being coupled between the inverter circuit and the transmitting coil;
    a receiving unit, comprising a receiving coil, a second compensation circuit and a rectifier circuit, the second compensation circuit being coupled between the receiving coil and the rectifier circuit;
    a power regulation circuit, configured to regulate an output signal of the wireless power transmission apparatus; and
    a control unit, coupled to the inverter circuit and the power regulation circuit respectively, and configured to: acquire a voltage-and-current phase difference of the transmitting unit, a detection signal, and a power detection value of the wireless power transmission apparatus; control an operating frequency of the inverter circuit according to the voltage-and-current phase difference and a preset phase difference in such a manner that the voltage-and-current phase difference is equal to the preset phase difference, and generate a power derating signal according to the detection signal, and control, according to the power derating signal, the power detection value and a power reference signal, the power regulation circuit to regulate the output signal;
    wherein the first compensation circuit, the transmitting coil, the receiving coil and the second compensation circuit form a resonant network, and parameters of an inductance component and a capacitance component in the resonant network are adjusted, so that the resonant network has three resonant frequency points which are a first resonant frequency point, a second resonant frequency point and a third resonant frequency point, wherein the second resonant frequency is higher than the first resonant frequency, the first resonant frequency is higher than the third resonant frequency point; and
    the operating frequency is higher than the second resonant frequency; or, the operating frequency is equal to the second resonant frequency; or, the operating frequency is lower than the second resonant frequency and higher than the first resonant frequency.

2. The wireless power transmission apparatus according to claim 1, wherein the wireless power transmission apparatus further comprises: a phase detection circuit;
    the phase detection circuit is coupled to the transmitting unit and the control unit, and configured to acquire a voltage phase signal and a current phase signal of the transmitting unit and calculate the voltage-and-current phase difference according to the voltage phase signal and the current phase signal.

3. The wireless power transmission apparatus according to claim 2, wherein the phase detection circuit comprises: a voltage phase detection circuit, a current phase detection circuit, and a phase difference calculation circuit;
the voltage phase detection circuit is coupled to an output terminal of the inverter circuit, and configured to detect the voltage phase signal of the transmitting unit;
the current phase detection circuit is coupled between the inverter circuit and the first compensation circuit, or between the first compensation circuit and the transmitting coil, configured to detect the current phase signal of the transmitting unit; and
the phase difference calculation circuit is configured to acquire the voltage phase signal and the current phase signal and calculate the voltage-and-current phase difference according to the voltage phase signal and the current phase signal.

4. The wireless power transmission apparatus according to claim 1, wherein the control unit is specifically configured to:
generate the power derating signal when the detection signal reaches a preset value, and provide a power regulation signal according to the power derating signal and the power reference signal, and control, according to the power regulation signal and the power detection value, the power regulation circuit to reduce the output signal, so that a current of the transmitting unit is reduced or a voltage of the transmitting unit is reduced.

5. The wireless power transmission apparatus according to claim 1, wherein the detection signal is a temperature signal and the preset value is a preset temperature value;
the control unit is configured to generate the power derating signal when the temperature signal reaches the preset temperature value.

6. The wireless power transmission apparatus according to claim 1, wherein the detection signal is a duration signal and the preset value is a preset duration signal;
the control unit is configured to generate the power derating signal when the duration signal reaches the preset duration signal.

7. The wireless power transmission apparatus according to claim 1, further comprising: an output power detection circuit;
the output power detection circuit is coupled to an output terminal of the wireless power transmission apparatus and the control unit, and configured to detect an output power of the wireless power transmission apparatus and provide the power detection value.

8. The wireless power transmission apparatus according to claim 1, further comprising: an output current detection circuit and an output voltage detection circuit;
the output current detection circuit is coupled to an output terminal of the wireless power transmission apparatus and the control unit, and configured to detect an output current of the wireless power transmission apparatus and provide a current detection value;
the output voltage detection circuit is coupled to the output terminal of the wireless power transmission apparatus and the control unit, and configured to detect an output voltage of the wireless power transmission apparatus and provide a voltage detection value;
the control unit is configured to acquire the current detection value and the voltage detection value, and acquire the power detection value according to the current detection value and the voltage detection value.

9. The wireless power transmission apparatus according to claim 1, wherein the output signal comprises one or more of an output current, an output voltage, or an output power.

10. The wireless power transmission apparatus according to claim 1, wherein the power regulation circuit comprises any one of a buck circuit, a boost circuit, or a buck-boost circuit.

11. The wireless power transmission apparatus according to claim 1, wherein the power regulation circuit is electrically coupled between an input terminal of the wireless power transmission apparatus and the transmitting unit; or
the power regulation circuit is electrically coupled between the receiving unit and the output terminal of the wireless power transmission apparatus.

12. The wireless power transmission apparatus according to claim 1, wherein the transmitting unit further comprises a transmitter transformer;
the transmitter transformer is coupled between the inverter circuit and the first compensation circuit; or
the transmitter transformer is coupled between the first compensation circuit and the transmitting coil.

13. The wireless power transmission apparatus according to claim 1, wherein the receiving unit further comprises: a receiver transformer;
the receiver transformer is coupled between the receiving coil and the second compensation circuit; or
the receiver transformer is coupled between the second compensation circuit and the rectifier circuit.

* * * * *